(12) United States Patent
Sayed et al.

(10) Patent No.: US 11,208,588 B1
(45) Date of Patent: Dec. 28, 2021

(54) METHODS OF DISSOLVING GAS HYDRATES

(71) Applicant: Saudi Arabian Oil Company, Dhahran (SA)

(72) Inventors: Mohammed Sayed, Katy, TX (US); Rajesh Kumar Saini, Cypress, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/090,145

(22) Filed: Nov. 5, 2020

(51) Int. Cl.
*C09K 8/52* (2006.01)

(52) U.S. Cl.
CPC .......... *C09K 8/52* (2013.01); *C09K 2208/22* (2013.01)

(58) Field of Classification Search
None
See application file for complete search history.

(56) References Cited

U.S. PATENT DOCUMENTS

| | | | |
|---|---|---|---|
| 4,330,037 A | 5/1982 | Richardson et al. | |
| 4,846,277 A * | 7/1989 | Khalil | C09K 8/703 166/280.1 |
| 6,035,933 A * | 3/2000 | Khalil | C09K 8/52 166/263 |
| 6,102,983 A | 8/2000 | Skaland | |
| 6,566,309 B1 | 5/2003 | Klug et al. | |
| 6,878,788 B2 | 4/2005 | Angel et al. | |
| 8,961,656 B2 | 2/2015 | Kang | |
| 9,145,465 B2 | 9/2015 | Spencer et al. | |
| 9,556,718 B2 | 1/2017 | Al-Dahlan et al. | |
| 9,803,133 B2 | 10/2017 | Al-Nakhli et al. | |
| 2012/0231977 A1* | 9/2012 | McKennis | C09K 8/882 507/103 |
| 2015/0087562 A1 | 3/2015 | Falana et al. | |
| 2015/0300142 A1 | 10/2015 | Al-Nakhli et al. | |

FOREIGN PATENT DOCUMENTS

| | | |
|---|---|---|
| CN | 101776209 A | 7/2010 |
| CN | 105316053 A | 2/2016 |
| CN | 110847871 A | 2/2020 |
| EP | 2336485 A2 | 6/2011 |
| WO | 2004106472 A1 | 12/2004 |
| WO | 2008089262 A1 | 7/2008 |
| WO | 20140165347 A1 | 12/2014 |

OTHER PUBLICATIONS

International Search Report and Written Opinion dated Jul. 30, 2021 received Aug. 11, 2021 pertaining to International application No. PCT/US2021/029314 filed Apr. 27, 2021.

* cited by examiner

*Primary Examiner* — John J Figueroa
(74) *Attorney, Agent, or Firm* — Dinsmore & Shohl LLP

(57) ABSTRACT

A method of dissolving a gas hydrate in a pipeline includes introducing a gas hydrate dissolving solution into the pipeline and allowing the gas hydrate dissolving solution to at least partially dissolve the gas hydrate in the pipeline. The gas hydrate dissolving solution includes a strong acid and a weak organic acid, and the strong acid expedites the reaction.

22 Claims, 9 Drawing Sheets

METHODS OF DISSOLVING GAS HYDRATES

TECHNICAL FIELD

Embodiments of the present disclosure generally relate to methods of dissolving gas hydrates.

BACKGROUND

Gas hydrates are crystalline clathrate compounds of gas molecules in water, which form under specific temperature and pressure conditions (low temperature and high pressure). The water molecules form cage structures around the corresponding gas molecules. The framework formed from the water molecules is by itself thermodynamically unstable and is stabilized only by the inclusion of gas molecules, resulting in an ice-like compound which, depending on pressure and gas composition, can also exist above the freezing point of water (up to more than 25° C.).

In the petroleum and natural gas industry in particular, the gas hydrates which form from water and the natural gas components methane, ethane, propane, iso-butane, n-butane, nitrogen, carbon dioxide and hydrogen sulfide are of considerable importance. Particularly in present day natural gas production, the existence of these gas hydrates presents a major problem, especially when wet gas or multiphase mixtures comprising water, gas and alkane mixtures under high pressure are exposed to low temperatures. Here, owing to their insolubility and crystalline structure, the formation of gas hydrates leads to blockage of a very wide range of transport means, such as pipelines, valves or production systems in which wet gas or multiphase mixtures are transported over long distances at low temperatures, as occurs in particular in colder regions of the world or on the seabed.

SUMMARY

To avoid such problems, gas hydrates are conventionally dissolved, or gas hydrate formation is conventionally inhibited, by introducing methanol. The addition of methanol shifts the thermodynamic limit of gas hydrate formation to lower temperatures (thermodynamic inhibition). However, the addition of methanol gives rise to greater safety problems (flash point and toxicity of the alcohols), logistic problems (greater storage tanks, recycling of these solvents) and accordingly high costs, especially in offshore production.

Accordingly, a need exists for alternative additives to methanol that either dissolve gas hydrates or inhibit gas hydrate formation in pipelines. The alternative additives described in this disclosure at least partially dissolve gas hydrates, prevent the nucleation and/or the growth of gas hydrates, or modify the gas hydrate growth in such a way that smaller hydrate particles result. The gas hydrate dissolving solution described in this disclosure generates heat that is used to dissolve the gas hydrate. Including a strong acid in the solution allows the solution to generate heat quickly and therefore accelerate reaction completion. Including an organic acid in the solution allows the solution to generate heat at a slower rate as compared to using strong acids. Therefore, including organic acids in the solution allows placement of the gas hydrate dissolving solution prior to generating heat prematurely.

In one embodiment, a method of at least partially dissolving a gas hydrate in a pipeline is provided. The method includes introducing a gas hydrate dissolving solution into the pipeline, the gas hydrate dissolving solution comprising sodium nitrite, ammonium chloride, a strong acid, and a weak organic acid; and allowing the gas hydrate dissolving solution to at least partially dissolve the gas hydrate in the pipeline, where the strong acid expedites the reaction. This solution generates the heat that is used to dissolve the gas hydrate. Using strong acid helps the solution to generate heat quicker as it speeds the reaction completion. Using organic acid will help the solution to generate heat but at a slower rate compared to using strong acids. Using organic acids to trigger the reaction gives us an option to place the chemical before generating heat prematurely.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
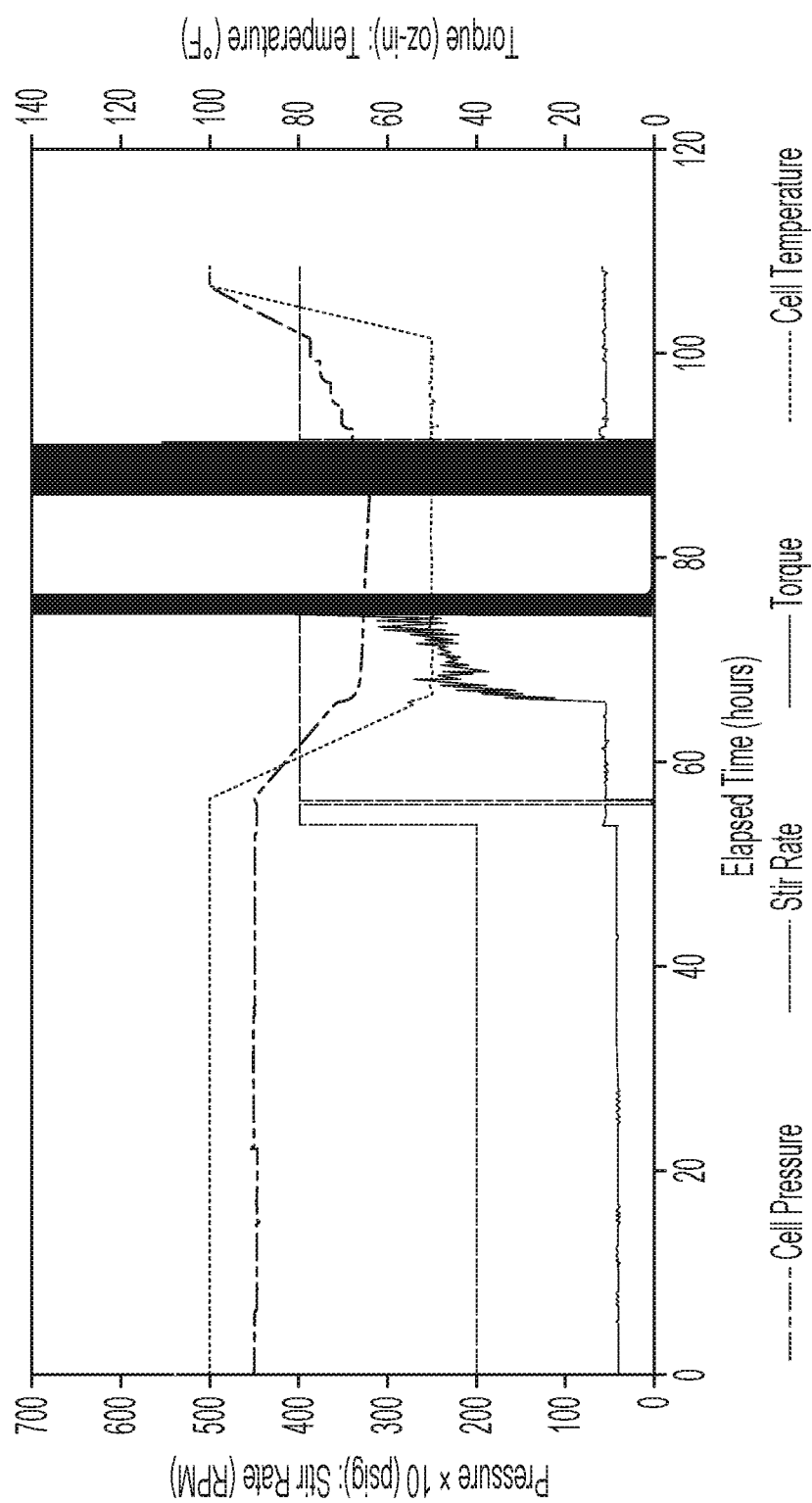
FIG. 1 graphically depicts the relationship between temperature, pressure, and torque (y-axis) and time (x-axis) during a gas hydrate experiment, according to one or more embodiments described in this disclosure.

As used throughout this disclosure, the term "gas hydrate" refers to a crystalline solid consisting of water with gas molecules in an ice-like cage structure. The general term for this type of solid is clathrate. Water molecules form a lattice structure into which many types of gas molecules can fit. Most gases, except hydrogen and helium, can form hydrates. $C_1$ to $nC_5$ hydrocarbons, $H_2S$ and $CO_2$ form gas hydrates at low temperature and high pressure. Heavier hydrocarbons may also enter the structure but do not form gas hydrates by themselves.

As used throughout this disclosure, the term "pipeline" refers to a tube or system of tubes used for transporting or delivering hydrocarbon fluid from the bottom of the well to the wellhead on the surface, or transport the hydrocarbon from the wellhead or wellsite in the field to a gathering system or to an offsite location.

As used throughout this disclosure, the term "upstream" refers to the relative position of two locations or components, relative to a flow of liquid. For example, a first location is upstream from a second location if the first location is traversed first along the flow path of the liquid than the second location.

During production operations of oil and gas wells, low-molecular-weight hydrocarbons, such as methane, ethane, propane, butane and iso-butane, and sometimes other low-molecular-weight species such as $CO_2$ and $H_2S$, are normally present in pipelines or other conduits used in the transportation and processing of natural gas and crude oil. When a flowing hydrocarbon fluid is subjected to low temperatures and/or elevated pressures in the presence of free water, gas hydrate crystals typically are formed. In these circumstances, a gas hydrate blockage or partial blockage may form in the pipeline. This gas hydrate may be remediated through the application of thermodynamic hydrate inhibitors/dissolvers which contact the hydrate accumulation directly, melt or extract water therefrom, and thereby remove the blockage from the pipeline.

Gas hydrates are clathrates (inclusion compounds) in which small hydrocarbon molecules are trapped in a lattice consisting of water molecules. Hydrates form as a consequence of the tendency of water to reorient in the presence of a non-polar solute (typically light hydrocarbon gases such as methane) to stabilize the lattice through, typically, van der Waals interactions while maintaining the hydrogen bonding between the water molecules. Hydrate formation inside a conduit such as a pipeline is undesirable because the crystals might cause plugging of flow lines, valves and instrumentation, reducing line capacity and/or causing physical damage to pipelines and equipment. The gas hydrate blockages may separate a pipe into two zones where one zone has a greater pressure than the second zone, separated by the gas hydrate blockage. If the blockage is suddenly cleared, a projectile may be generated which may cause damage to the pipeline and any surrounding infrastructure.

In order to remedy this undesired phenomenon, the addition of inhibiting agents such as melting point depressants may dissolve the gas hydrate without suddenly dislodging the gas hydrate. Methanol is conventionally used as melting point depressants to dissolve gas hydrates. However, the volume of methanol needed to effectively dissolve the gas hydrate may far exceed the amount required to sufficiently dilute the melt water. Additionally, methanol has a low flash point temperature (approximately 12° C.), rendering it unsafe to be stored in large volumes in areas where the ambient temperature exceeds 10° C. and also during pumping as it can catch fire due to static electric build up or due to heat generated in pumping equipment during pumping.

Embodiments of the present disclosure relate to methods of dissolving gas hydrates in pipelines. Gas hydrates may form in a pipeline having a pressure greater than 500 pounds per square inch (psi) and a temperature less than 100° F. In embodiments, the pipeline may have a pressure of greater than 500 psi, greater than 1000 psi, greater than 1500 psi, greater than 2000 psi, greater than 2200 psi, greater than 2500 psi, greater than 3000 psi, greater than 5000 psi, or greater than 10,000 psi. The pipeline may have a pressure of from 500 to 10000 psi, from 500 to 5000 psi, from 500 to 3000 psi, from 500 to 2500 psi, from 500 to 2200 psi, from 500 to 2000 psi, from 500 to 1500 psi, from 500 to 1000 psi, from 1000 to 10000 psi, from 1000 to 5000 psi, from 1000 to 3000 psi, from 1000 to 2500 psi, from 1000 to 2200 psi, from 1000 to 2000 psi, from 1000 to 1500 psi, from 1500 to 10000 psi, from 1500 to 5000 psi, from 1500 to 3000 psi, from 1500 to 2500 psi, from 1500 to 2200 psi, from 1500 to 2000 psi, from 2000 to 10000 psi, from 2000 to 5000 psi, from 2000 to 3000 psi, from 2000 to 2500 psi, from 2000 to 2200 psi, from 2200 to 3000 psi, from 2200 to 2500 psi, from 2500 to 3000 psi, from 3000 to 10000 psi, from 3000 to 5000 psi, or from 5000 to 10000 psi. In embodiments, the pipeline may have a temperature of less than 200° F., less than 150° F., less than 110° F., less than 100° F., less than 95° F., less than 90° F., less than 85° F., less than 80° F., less than 70° F., less than 60° F., less than 50° F., less than 35° F., less than 30° F., or less than 10° F. The gas hydrate may include free water, carbon dioxide, hydrogen sulfide, lower molecular weight gaseous hydrocarbons such as methane, ethane, propane, iso-butane and n-butane, fresh water, formation brine or combinations thereof. The free water may be water encapsulated within the gas hydrate.

Methods of dissolving a gas hydrate in a pipeline may include introducing a gas hydrate dissolving solution into the pipeline and allowing the gas hydrate dissolving solution to at least partially dissolve the gas hydrate in the pipeline. The gas hydrate dissolving solution may include sodium nitrite, ammonium chloride, a strong acid, and a weak organic acid. The gas hydrate dissolving solution includes a glycol, a glycol ether, dimethylformamide, cesium formate, potassium formate, sodium nitrite, ammonium chloride, a strong acid, a weak organic acid, or combinations thereof. The gas hydrate dissolving solution described in this disclosure generates heat that is used to dissolve the gas hydrate. Including a strong acid in the solution allows the solution to generate heat quickly and therefore accelerate reaction completion. Including an organic acid in the solution allows the solution to generate heat at a slower rate as compared to using strong acids. Therefore, including organic acids in the solution allows placement of the gas hydrate dissolving solution prior to generating heat prematurely. Methods of dissolving may include introducing the gas hydrate dissolving solution into the pipeline as two separate solutions, such as a first gas hydrate dissolving solution including sodium nitrite and ammonium chloride and a second gas hydrate dissolving solution comprising the strong acid and the weak organic acid. The first gas hydrate dissolving solution and the second gas hydrate dissolving solution may be pumped separately in two separate conduits or pipelines that join together upstream of where the gas hydrate is formed. Methods of dissolving may include introducing encapsulated sodium nitrite, encapsulated ammonium chloride, an encapsulated strong acid, and an encapsulated weak organic acid into the pipeline In embodiments, gas hydrates may form in pipelines where hydrocarbon fluid is flowing. Specifically, in embodiments, hydrocarbon fluid may be flowing through the pipeline when introducing the gas hydrate dissolving solution. The hydrocarbon fluid may include methane, ethane, propane, butane, pentane, hexane, heptane, octane, nonane, carbon dioxide, hydrogen sulfide, dinitrogen, crude oil, fresh water, formation brine, or combinations of these.

Introducing the gas hydrate dissolving solution may include introducing from 1 to 40 volume percent (vol. %) gas hydrate dissolving solution, based on a total volume of water within the hydrocarbon fluid in the pipeline. In embodiments, introducing the gas hydrate dissolving solution may include introducing from 1 to 200 vol. %, from 1 to 100 vol. %, from 1 to 70 vol. %, from 1 to 60 vol. %, from 1 to 55 vol. %, from 1 to 50 vol. %, from 1 to 45 vol. %, from 1 to 40 vol. %, from 1 to 35 vol. %, from 1 to 30 vol. %, from 1 to 25 vol. %, from 1 to 20 vol. %, from 1 to 15 vol. %, from 1 to 10 vol. %, from 1 to 5 vol. %, from 5 to 200 vol. %, from 5 to 100 vol. %, from 5 to 70 vol. %, from 5 to 60 vol. %, from 5 to 55 vol. %, from 5 to 50 vol. %, from 5 to 45 vol. %, from 5 to 40 vol. %, from 5 to 35 vol. %, from 5 to 30 vol. %, from 5 to 25 vol. %, from 5 to 20 vol. %, from 5 to 15 vol. %, from 5 to 10 vol. %, from 10 to 200 vol. %, from 10 to 100 vol. %, from 10 to 70 vol. %, from 10 to 60 vol. %, from 10 to 55 vol. %, from 10 to 50 vol. %, from 10 to 45 vol. %, from 10 to 40 vol. %, from 10 to 35 vol. %, from 10 to 30 vol. %, from 10 to 25 vol. %, from 10 to 20 vol. %, from 10 to 15 vol. %, from 15 to 200 vol. %, from 15 to 100 vol. %, from 15 to 70 vol. %, from 15 to 60 vol. %, from 15 to 55 vol. %, from 15 to 50 vol. %, from 15 to 45 vol. %, from 15 to 40 vol. %, from 15 to 35 vol. %, from 15 to 30 vol. %, from 15 to 25 vol. %, from 15 to 20 vol. %, from 20 to 200 vol. %, from 20 to 100 vol. %, from 20 to 70 vol. %, from 20 to 60 vol. %, from 20 to 55 vol. %, from 20 to 50 vol. %, from 20 to 45 vol. %, from 20 to 40 vol. %, from 20 to 35 vol. %, from 20 to 30 vol. %, from 20 to 25 vol. %, from 25 to 200 vol. %, from 25 to 100 vol. %, from 25 to 70 vol. %, from 25 to 60 vol. %, from 25 to 55 vol. %, from 25 to 50 vol. %, from 25 to 45 vol. %, from 25 to 40 vol. %, from 25 to 35 vol. %, from 25 to 30 vol. %, from 30 to 200 vol. %, from 30 to 100 vol. %, from 30 to 70 vol. %, from 30 to 60 vol. %, from 30 to 55 vol. %, from 30 to 50 vol. %, from 30 to 45 vol. %, from 30 to 40 vol. %, from 30 to 35 vol. %, from 35 to 200 vol. %, from 35 to 100 vol. %, from 35 to 70 vol. %, from 35 to 60 vol. %, from 35 to 50 vol. %, from 35 to 45 vol. %, from 35 to 40 vol. %, from 40 to 200 vol. %, from 40 to 100 vol. %, from 40 to 70 vol. %, from 40 to 60 vol. %, from 40 to 55 vol. %, from 40 to 50 vol. %, from 40 to 45 vol. %, from 45 to 200 vol. %, from 45 to 100 vol. %, from 45 to 70 vol. %, from 45 to 60 vol. %, from 45 to 55 vol. %, from 45 to 50 vol. %, from 50 to 200 vol. %, from 50 to 100 vol. %, from 50 to 70 vol. %, from 50 to 60 vol. %, from 50 to 55 vol. %, from 55 to 200 vol. %, from 55 to 100 vol. %, from 55 to 70 vol. %, from 55 to 60 vol. %, from 70 to 200 vol. %, from 70 to 100 vol. %, or from 100 to 200 vol. % of the gas hydrate dissolving solution, based on a total volume of water within the hydrocarbon fluid in the pipeline. In embodiments, introducing the gas hydrate dissolving solution may include introducing from 5 to 30 vol. % of the gas hydrate dissolving solution, based on a total volume of water within the hydrocarbon fluid in the pipeline. In embodiments, introducing the gas hydrate dissolving solution may include introducing from 5 to 60 vol. % of the gas hydrate dissolving solution, based on a total volume of water within the hydrocarbon fluid in the pipeline.

In embodiments, introducing the gas hydrate dissolving solution includes introducing from 3 to 7 injections of the gas hydrate dissolving solution into the pipeline. A first injection may include from 5 to 15 vol. % of the gas hydrate dissolving solution, based on a total volume of water within the hydrocarbon fluid in the pipeline. In embodiments, the first injection may include from 2 to 20 vol. %, from 2 to 15 vol. %, from 2 to 12.5 vol. %, from 2 to 11 vol. %, from 2 to 10 vol. %, from 2 to 9 vol. %, from 2 to 7.5 vol. %, from 2 to 5 vol. %, from 5 to 20 vol. %, from 5 to 15 vol. %, from 5 to 12.5 vol. %, from 5 to 11 vol. %, from 5 to 10 vol. %, from 5 to 9 vol. %, from 5 to 7.5 vol. %, from 7.5 to 20 vol. %, from 7.5 to 15 vol. %, from 7.5 to 12.5 vol. %, from 7.5 to 11 vol. %, from 7.5 to 10 vol. %, from 7.5 to 9 vol. %, from 9 to 20 vol. %, from 9 to 15 vol. %, from 9 to 12.5 vol. %, from 9 to 11 vol. %, from 9 to 10 vol. %, from 10 to 20 vol. %, from 10 to 15 vol. %, from 10 to 12.5 vol. %, from 10 to 11 vol. %, from 11 to 20 vol. %, from 11 to 15 vol. %, from 11 to 12.5 vol. %, from 12.5 to 20 vol. %, from 12.5 to 15 vol. %, or from 15 to 20 vol. % of the gas hydrate dissolving solution, based on a total volume of water within the hydrocarbon fluid in the pipeline.

In embodiments, introducing the gas hydrate dissolving solution includes introducing from 1 to 7 injections of the gas hydrate dissolving solution into the pipeline. A first injection may include from 5 to 15 vol. % of the gas hydrate dissolving solution, based on a total volume of water within the hydrocarbon fluid in the pipeline. In embodiments, the first injection may include from 2 to 20 vol. %, from 2 to 15 vol. %, from 2 to 12.5 vol. %, from 2 to 11 vol. %, from 2 to 10 vol. %, from 2 to 9 vol. %, from 2 to 7.5 vol. %, from 2 to 5 vol. %, from 5 to 20 vol. %, from 5 to 15 vol. %, from 5 to 12.5 vol. %, from 5 to 11 vol. %, from 5 to 10 vol. %, from 5 to 9 vol. %, from 5 to 7.5 vol. %, from 7.5 to 20 vol. %, from 7.5 to 15 vol. %, from 7.5 to 12.5 vol. %, from 7.5 to 11 vol. %, from 7.5 to 10 vol. %, from 7.5 to 9 vol. %, from 9 to 20 vol. %, from 9 to 15 vol. %, from 9 to 12.5 vol. %, from 9 to 11 vol. %, from 9 to 10 vol. %, from 10 to 20 vol. %, from 10 to 15 vol. %, from 10 to 12.5 vol. %, from 10 to 11 vol. %, from 11 to 20 vol. %, from 11 to 15 vol. %, from 11 to 12.5 vol. %, from 12.5 to 20 vol. %, from 12.5 to 15 vol. %, or from 15 to 20 vol. % of the gas hydrate dissolving solution, based on a total volume of water within the hydrocarbon fluid in the pipeline.

After introducing the first injection, additional injections may be introduced into the pipeline. There may be from 1 to 20, from 1 to 15, from 1 to 10, from 1 to 8, from 1 to 7, from 1 to 6, from 1 to 5, from 1 to 4, from 1 to 3, from 1 to 2, from 2 to 20, from 2 to 15, from 2 to 10, from 2 to 8, from 2 to 7, from 2 to 6, from 2 to 5, from 2 to 4, from 2 to 3, from 3 to 20, from 3 to 15, from 3 to 10, from 3 to 8, from 3 to 7, from 3 to 6, from 3 to 5, from 3 to 4, from 4 to 20, from 4 to 15, from 4 to 10, from 4 to 8, from 4 to 7, from 4 to 6, from 4 to 5, from 5 to 20, from 5 to 15, from 5 to 10, from 5 to 8, from 5 to 7, from 5 to 6, from 6 to 20, from 6 to 15, from 6 to 10, from 6 to 8, from 6 to 7, from 7 to 20, from 7 to 15, from 7 to 10, from 7 to 8, from 8 to 20, from 8 to 15, from 8 to 10, from 10 to 20, from 10 to 15, or from 15 to 20 additional injections.

As stated previously, the gas hydrate dissolving solution may include sodium nitrite, ammonium chloride, a strong acid, and a weak organic acid. The strong acid within the gas hydrate dissolving solution expedites the reaction alongside the weak organic acid. The strong acid expedites the reaction and creates enough heat to dissolve the hydrate plug, whereas using the organic acid alone will not expedite the reaction and will not achieve a temperature great enough to at least partially dissolve the hydrate plug (such as a temperature of at least 180° F., or from 180° F. to 200° F.) in from 2 to 5 minutes, from 2 to 4 minutes, from 2 to 3 minutes, from 3 to 5 minutes, from 3 to 4 minutes, or from 4 to 5 minutes. The strong acid may include hydrochloric acid. The strong acid may include from 5 to 50 wt. %, from 5 to 40 wt. %, from 5 to 35 wt. %, from 5 to 30 wt. %, from 5 to 25 wt. %, from 5 to 20 wt. %, from 5 to 17 wt. %, from 10 to 50 wt. %, from 10 to 40 wt. %, from 10 to 35 wt. %, from 10 to 30 wt. %, from 10 to 25 wt. %, from 10 to 20 wt. %, from 10 to 17 wt. %, from 13 to 50 wt. %, from 13 to 40 wt. %, from 13 to 35 wt. %, from 13 to 30 wt. %, from 13 to 25 wt. %, from 13 to 20 wt. %, from 13 to 17 wt. %, from 17 to 50 wt. %, from 17 to 40 wt. %, from 17 to 35 wt. %, from 17 to 30 wt. %, from 17 to 25 wt. %, from 17 to 20 wt. %, from 20 to 50 wt. %, from 20 to 40 wt. %, from 20 to 35 wt. %, from 20 to 30 wt. %, from 20 to 25 wt. %, from 25 to 50 wt. %, from 25 to 40 wt. %, from 25 to 35 wt. %, from 25 to 30 wt. %, from 30 to 50 wt. %, from 30 to 40 wt. %, from 30 to 35 wt. %, from 35 to 50 wt. %, from 35 to 40 wt. %, from 40 to 50 wt. %, approximately 37 wt. %, approximately 36.5 wt. %, or approximately 15 wt. % hydrochloric acid by weight of the strong acid. The strong acid may be an aqueous solution including from 5 to 50 wt. %, from 5 to 40 wt. %, from 5 to 30 wt. %, from 5 to 20 wt. %, from 5 to 15 wt. %, from 5 to 12 wt. %, from 5 to 10 wt. %, from 5 to 8 wt. %, from 8 to 50 wt. %, from 8 to 40 wt. %, from 8 to 30 wt. %, from 8 to 20 wt. %, from 8 to 15 wt. %, from 8 to 12 wt. %, from 8 to 10 wt. %, from 10 to 50 wt. %, from 10 to 40 wt. %, from 10 to 30 wt. %, from 10 to 20 wt. %, from 10 to 15 wt. %, from 10 to 12 wt. %, from 12 to 50 wt. %, from 12 to 40 wt. %, from 12 to 30 wt. %, from 12 to 20 wt. %, from 12 to 15 wt. %, from 15 to 50 wt. %, from 15 to 40 wt. %, from 15 to 30 wt. %, from 15 to 20 wt. %, from 20 to 50 wt. %, from 20 to 40 wt. %, from 20 to 30 wt. %, from 30 to 50 wt. %, from 30 to 40 wt. %, from 40 to 50 wt. %, or approximately 15 wt. % strong acid by weight of the aqueous solution. The weak organic acid may include acetic acid. The weak organic acid may include from 5 to 50 wt. %, from 5 to 30 wt. %, from 5 to 25 wt. %, from 5 to 20 wt. %, from 5 to 15 wt. %, from 5 to 12 wt. %, from 8 to 50 wt. %, from 8 to 30 wt. %, from 8 to 25 wt. %, from 8 to 20 wt. %, from 8 to 15 wt. %, from 8 to 12 wt. %, or approximately 10 wt. % acetic acid by weight of the weak organic acid. The weak organic acid may be an aqueous solution including from 5 to 50 wt. %, from 5 to 40 wt. %, from 5 to 30 wt. %, from 5 to 20 wt. %, from 5 to 15 wt. %, from 5 to 12 wt. %, from 5 to 10 wt. %, from 5 to 8 wt. %, from 8 to 50 wt. %, from 8 to 40 wt. %, from 8 to 30 wt. %, from 8 to 20 wt. %, from 8 to 15 wt. %, from 8 to 12 wt. %, from 8 to 10 wt. %, from 10 to 50 wt. %, from 10 to 40 wt. %, from 10 to 30 wt. %, from 10 to 20 wt. %, from 10 to 15 wt. %, from 10 to 12 wt. %, from 12 to 50 wt. %, from 12 to 40 wt. %, from 12 to 30 wt. %, from 12 to 20 wt. %, from 12 to 15 wt. %, from 15 to 50 wt. %, from 15 to 40 wt. %, from 15 to 30 wt. %, from 15 to 20 wt. %, from 20 to 50 wt. %, from 20 to 40 wt. %, from 20 to 30 wt. %, from 30 to 50 wt. %, from 30 to 40 wt. %, from 40 to 50 wt. %, or approximately 10 wt. % weak organic acid by weight of the aqueous solution. In embodiments, the weak organic acid may include glacial acetic acid, which is also known as water-free (anhydrous) acetic acid. The glacial acetic acid may include from 90 to 99.9 wt. %, from 90 to 99.8 wt. %, from 90 to 99.7 wt. %, from 90 to 99.5 wt. %, from 90 to 99.0 wt. %, from 90 to 97 wt. %, from 90 to 95 wt. %, from 95 to 99.9 wt. %, from 95 to 99.8 wt. %, from 95 to 99.7 wt. %, from 95 to 99.5 wt. %, from 95 to 99.0 wt. %, from 95 to 97 wt. %, from 97 to 99.9 wt. %, from 97 to 99.8 wt. %, from 97 to 99.7 wt. %, from 97 to 99.5 wt. %, from 97 to 99.0 wt. %, from 99.0 to 99.9 wt. %, from 99.0 to 99.8 wt. %, from 99.0 to 99.7 wt. %, from 99.0 to 99.5 wt. %, from 99.5 to 99.9 wt. %, from 99.5 to 99.8 wt. %, from 99.5 to 99.7 wt. %, from 99.7 to 99.9 wt. %, from 99.7 to 99.8 wt. %, from 99.8 to 99.9 wt. %, or approximately 99.8 wt. % acetic acid.

The gas hydrate dissolving solution may include from 30 to 70 vol. %, from 30 to 60 vol. %, from 30 to 55 vol. %, from 30 to 50 vol. %, from 40 to 70 vol. %, from 40 to 60 vol. %, from 40 to 55 vol. %, from 40 to 50 vol. %, from 45 to 70 vol. %, from 45 to 60 vol. %, from 45 to 55 vol. %, from 45 to 50 vol. %, or approximately 48 vol. % sodium nitrite by volume of the gas hydrate dissolving solution. The gas hydrate dissolving solution may include from 1 to 70 vol. %, from 1 to 60 vol. %, from 1 to 50 vol. %, from 1 to 40 vol. %, from 1 to 35 vol. %, from 1 to 30 vol. %, from 1 to 25 vol. %, from 1 to 20 vol. %, from 1 to 15 vol. %, from 1 to 10 vol. %, from 1 to 5 vol. %, from 5 to 70 vol. %, from 5 to 60 vol. %, from 5 to 50 vol. %, from 5 to 40 vol. %, from 5 to 35 vol. %, from 5 to 30 vol. %, from 5 to 25 vol. %, from 5 to 20 vol. %, from 5 to 15 vol. %, from 5 to 10 vol. %, from 10 to 70 vol. %, from 10 to 60 vol. %, from 10 to 50 vol. %, from 10 to 40 vol. %, from 10 to 35 vol. %, from 10 to 30 vol. %, from 10 to 25 vol. %, from 10 to 20 vol. %, from 10 to 15 vol. %, from 15 to 70 vol. %, from 15 to 60 vol. %, from 15 to 50 vol. %, from 15 to 40 vol. %, from 15 to 35 vol. %, from 15 to 30 vol. %, from 15 to 25 vol. %, from 15 to 20 vol. %, from 20 to 70 vol. %, from 20 to 60 vol. %, from 20 to 50 vol. %, from 20 to 40 vol. %, from 20 to 35 vol. %, from 20 to 30 vol. %, from 20 to 25 vol. %, from 25 to 70 vol. %, from 25 to 60 vol. %, from 25 to 50 vol. %, from 25 to 40 vol. %, from 25 to 35 vol. %, from 25 to 30 vol. %, from 30 to 70 vol. %, from 30 to 60 vol. %, from 30 to 50 vol. %, from 30 to 40 vol. %, from 30 to 35 vol. %, from 35 to 70 vol. %, from 35 to 60 vol. %, from 35 to 50 vol. %, from 35 to 40 vol. %, from 40 to 70 vol. %, from 40 to 60 vol. %, from 40 to 50 vol. %, from 50 to 70 vol. %, from 50 to 60 vol. %, from 60 to 70 vol. %, or approximately 25 vol. % sodium nitrite based on a total volume of water in the pipeline.

In embodiments, the sodium nitrite may be in solution, where the solution includes from 0.5 to 10 moles, from 0.5 to 8 moles, from 0.5 to 6 moles, from 0.5 to 5.5 moles, from 0.5 to 5 moles, from 0.5 to 4.5 moles, from 0.5 to 4 moles, from 0.5 to 3 moles, from 0.5 to 1 mole, from 1 to 10 moles, from 1 to 8 moles, from 1 to 6 moles, from 1 to 5.5 moles, from 1 to 5 moles, from 1 to 4.5 moles, from 1 to 4 moles, from 1 to 3 moles, from 3 to 10 moles, from 3 to 8 moles, from 3 to 6 moles, from 3 to 5.5 moles, from 3 to 5 moles, from 3 to 4.5 moles, from 3 to 4 moles, from 4 to 10 moles, from 4 to 8 moles, from 4 to 6 moles, from 4 to 5.5 moles, from 4 to 5 moles, from 4 to 4.5 moles, from 4.5 to 10 moles, from 4.5 to 8 moles, from 4.5 to 6 moles, from 4.5 to 5.5 moles, from 4.5 to 5 moles, from 5 to 10 moles, from 5 to 8 moles, from 5 to 6 moles, from 5 to 5.5 moles, from 5.5 to 10 moles, from 5.5 to 8 moles, from 5.5 to 6 moles, from 6 to 10 moles, from 6 to 8 moles, from 8 to 10 moles, or approximately 5 moles sodium nitrite.

The gas hydrate dissolving solution may include from 30 to 70 vol. %, from 30 to 60 vol. %, from 30 to 55 vol. %, from 30 to 50 vol. %, from 40 to 70 vol. %, from 40 to 60 vol. %, from 40 to 55 vol. %, from 40 to 50 vol. %, from 45 to 70 vol. %, from 45 to 60 vol. %, from 45 to 55 vol. %, from 45 to 50 vol. %, or approximately 48 vol. % ammonium chloride by volume of the gas hydrate dissolving solution. The gas hydrate dissolving solution may include from 1 to 70 vol. %, from 1 to 60 vol. %, from 1 to 50 vol. %, from 1 to 40 vol. %, from 1 to 35 vol. %, from 1 to 30 vol. %, from 1 to 25 vol. %, from 1 to 20 vol. %, from 1 to 15 vol. %, from 1 to 10 vol. %, from 1 to 5 vol. %, from 5 to 70 vol. %, from 5 to 60 vol. %, from 5 to 50 vol. %, from 5 to 40 vol. %, from 5 to 35 vol. %, from 5 to 30 vol. %, from 5 to 25 vol. %, from 5 to 20 vol. %, from 5 to 15 vol. %, from 5 to 10 vol. %, from 10 to 70 vol. %, from 10 to 60 vol. %, from 10 to 50 vol. %, from 10 to 40 vol. %, from 10 to 35 vol. %, from 10 to 30 vol. %, from 10 to 25 vol. %, from 10 to 20 vol. %, from 10 to 15 vol. %, from 15 to 70 vol. %, from 15 to 60 vol. %, from 15 to 50 vol. %, from 15 to 40 vol. %, from 15 to 35 vol. %, from 15 to 30 vol. %, from 15 to 25 vol. %, from 15 to 20 vol. %, from 20 to 70 vol. %, from 20 to 60 vol. %, from 20 to 50 vol. %, from 20 to 40 vol. %, from 20 to 35 vol. %, from 20 to 30 vol. %, from 20 to 25 vol. %, from 25 to 70 vol. %, from 25 to 60 vol. %, from 25 to 50 vol. %, from 25 to 40 vol. %, from 25 to 35 vol. %, from 25 to 30 vol. %, from 30 to 70 vol. %, from 30 to 60 vol. %, from 30 to 50 vol. %, from 30 to 40 vol. %, from 30 to 35 vol. %, from 35 to 70 vol. %, from 35 to 60 vol. %, from 35 to 50 vol. %, from 35 to 40 vol. %, from 40 to 70 vol. %, from 40 to 60 vol. %, from 40 to 50 vol. %, from 50 to 70 vol. %, from 50 to 60 vol. %, from 60 to 70 vol. %, or approximately 25 vol. % ammonium chloride based on a total volume of water in the pipeline.

In embodiments, the ammonium chloride may be in solution, where the solution includes from 0.5 to 10 moles, from 0.5 to 8 moles, from 0.5 to 6 moles, from 0.5 to 5.5 moles, from 0.5 to 5 moles, from 0.5 to 4.5 moles, from 0.5 to 4 moles, from 0.5 to 3 moles, from 0.5 to 1 mole, from 1 to 10 moles, from 1 to 8 moles, from 1 to 6 moles, from 1 to 5.5 moles, from 1 to 5 moles, from 1 to 4.5 moles, from 1 to 4 moles, from 1 to 3 moles, from 3 to 10 moles, from 3 to 8 moles, from 3 to 6 moles, from 3 to 5.5 moles, from 3 to 5 moles, from 3 to 4.5 moles, from 3 to 4 moles, from 4 to 10 moles, from 4 to 8 moles, from 4 to 6 moles, from 4 to 5.5 moles, from 4 to 5 moles, from 4 to 4.5 moles, from 4.5 to 10 moles, from 4.5 to 8 moles, from 4.5 to 6 moles, from 4.5 to 5.5 moles, from 4.5 to 5 moles, from 5 to 10 moles, from 5 to 8 moles, from 5 to 6 moles, from 5 to 5.5 moles, from 5.5 to 10 moles, from 5.5 to 8 moles, from 5.5 to 6 moles, from 6 to 10 moles, from 6 to 8 moles, from 8 to 10 moles, or approximately 5 moles ammonium chloride.

The gas hydrate dissolving solution may include from 1 to 10 vol. %, from 1 to 7 vol. %, from 1 to 5 vol. %, from 1 to 4 vol. %, from 1 to 3 vol. %, from 1 to 2 vol. %, from 2 to 10 vol. %, from 2 to 7 vol. %, from 2 to 5 vol. %, from 2 to 4 vol. %, from 2 to 3 vol. %, from 3 to 10 vol. %, from 3 to 7 vol. %, from 3 to 5 vol. %, from 3 to 4 vol. %, from 4 to 10 vol. %, from 4 to 7 vol. %, from 4 to 5 vol. %, from 5 to 10 vol. %, from 5 to 7 vol. %, from 7 to 10 vol. %, or approximately 3 vol. % weak organic acid by volume of the gas hydrate dissolving solution. The gas hydrate dissolving solution may include from 0.5 to 5 vol. %, from 1 to 5 vol. %, from 1.2 to 5 vol. %, from 1.5 to 5 vol. %, from 1.7 to 5 vol. %, from 2 to 5 vol. %, from 3 to 5 vol. %, from 4 to 5 vol. %, from 0.5 to 4 vol. %, from 1 to 4 vol. %, from 1.2 to 4 vol. %, from 1.5 to 4 vol. %, from 1.7 to 4 vol. %, from 2 to 4 vol. %, from 3 to 4 vol. %, from 0.5 to 3 vol. %, from 1 to 3 vol. %, from 1.2 to 3 vol. %, from 1.5 to 3 vol. %, from 1.7 to 3 vol. %, from 2 to 3 vol. %, from 0.5 to 2 vol. %, from 1 to 2 vol. %, from 1.2 to 2 vol. %, from 1.5 to 2 vol. %, from 1.7 to 2 vol. %, from 0.5 to 1.7 vol. %, from 1 to 1.7 vol. %, from 1.2 to 1.7 vol. %, from 1.5 to 1.7 vol. %, from 0.5 to 1.5 vol. %, from 1 to 1.5 vol. %, from 1.2 to 1.5 vol. %, from 0.5 to 1.2 vol. %, from 1 to 1.2 vol. %, from 0.5 to 1 vol. %, or approximately 1.67 vol. % weak organic acid based on a total volume of water in the pipeline.

The gas hydrate dissolving solution may include from 0.5 to 5 vol. %, from 0.5 to 4 vol. %, from 0.5 to 3 vol. %, from 0.5 to 2 vol. %, from 0.5 to 1.5 vol. %, from 0.5 to 1 vol. %, from 1 to 5 vol. %, from 1 to 4 vol. %, from 1 to 3 vol. %, from 1 to 2 vol. %, from 1 to 1.5 vol. %, from 1.5 to 5 vol. %, from 1.5 to 4 vol. %, from 1.5 to 3 vol. %, from 1.5 to 2 vol. %, from 2 to 5 vol. %, from 2 to 4 vol. %, from 2 to 3 vol. %, from 3 to 5 vol. %, from 3 to 4 vol. %, from 4 to 5 vol. %, or approximately 1.5 vol. % strong acid by volume of the gas hydrate dissolving solution. The gas hydrate dissolving solution may include from 0.2 to 3 vol. %, from 0.2 to 2 vol. %, from 0.2 to 1.8 vol. %, from 0.2 to 1.5 vol. %, from 0.2 to 1.3 vol. %, from 0.2 to 1 vol. %, from 0.2 to 0.9 vol. %, from 0.2 to 0.8 vol. %, from 0.2 to 0.5 vol. %, from 0.5 to 3 vol. %, from 0.5 to 2 vol. %, from 0.5 to 1.8 vol. %, from 0.5 to 1.5 vol. %, from 0.5 to 1.3 vol. %, from 0.5 to 1 vol. %, from 0.5 to 0.9 vol. %, from 0.5 to 0.8 vol. %, from 0.8 to 3 vol. %, from 0.8 to 2 vol. %, from 0.8 to 1.8 vol. %, from 0.8 to 1.5 vol. %, from 0.8 to 1.3 vol. %, from 0.8 to 1 vol. %, from 0.8 to 0.9 vol. %, from 1 to 3 vol. %, from 1 to 2 vol. %, from 1 to 1.8 vol. %, from 1 to 1.5 vol. %, from 1 to 1.3 vol. %, from 1.3 to 3 vol. %, from 1.3 to 2 vol. %, from 1.3 to 1.8 vol. %, from 1.3 to 1.5 vol. %, from 1.5 to 3 vol. %, from 1.5 to 2 vol. %, from 1.5 to 1.8 vol. %, from 1.8 to 3 vol. %, from 1.8 to 2 vol. %, from 2 to 3 vol. %, or approximately 0.8 vol. % strong acid by volume of the gas hydrate dissolving solution.

As stated previously, the gas hydrate dissolving solution may include glycols, glycol ethers, dimethylformamide, cesium formate, potassium formate, or combinations thereof. In embodiments, the gas hydrate dissolving solution may include dimethylformamide or may consist of dimethylformamide. In embodiments, the gas hydrate dissolving solution may include glycol or may consist of glycol. The glycol may be chosen from the group consisting of ethylene glycol monomethyl ether, diethylene glycol monomethyl ether, ethylene glycol monobutyl ether, diethylene glycol monoethyl ether, 2-butoxyethanol, and propylene glycol.

The gas hydrate dissolving solution may have a boiling point of greater than 80° C. In embodiments, the gas hydrate dissolving solution may have a boiling point of greater than 80° C., 85° C., 90° C., 95° C., 100° C., 105° C., 110° C., 120° C., 150° C., or 200° C. In embodiments, the gas hydrate dissolving solution may have a boiling point of from 80° C. to 200° C., from 80° C. to 150° C., from 80° C. to 120° C., from 80° C. to 110° C., from 80° C. to 105° C., from 80° C. to 100° C., from 80° C. to 95° C., from 80° C. to 90° C., from 80° C. to 85° C., from 85° C. to 200° C., from 85° C. to 150° C., from 85° C. to 120° C., from 85° C. to 110° C., from 85° C. to 105° C., from 85° C. to 100° C., from 85° C. to 95° C., from 85° C. to 90° C., from 90° C. to 200° C., from 90° C. to 150° C., from 90° C. to 120° C., from 90° C. to 110° C., from 90° C. to 105° C., from 90° C. to 100° C., from 90° C. to 95° C., from 95° C. to 200° C., from 95° C. to 150° C., from 95° C. to 120° C., from 95° C. to 110° C., from 95° C. to 105° C., from 95° C. to 100° C., from 100° C. to 200° C., from 100° C. to 150° C., from 100° C. to 120° C., from 100° C. to 110° C., from 100° C. to 105° C., from 105° C. to 200° C., from 105° C. to 150° C., from 105° C. to 120° C., from 105° C. to 110° C., from 110° C. to 200° C., from 110° C. to 150° C., from 110° C. to 120° C., from 120° C. to 200° C., from 120° C. to 150° C., or from 150° C. to 200° C. The gas hydrate dissolving solution may include sodium nitrite, ammonium chloride, a strong acid, and a weak organic acid, and may have a boiling point as described previously.

The gas hydrate dissolving solution may have a flash point of greater than 50° C. In embodiments, the gas hydrate dissolving solution may have a flash point of greater than 50° C., greater than 55° C., greater than 60° C., greater than 65° C., greater than 70° C., greater than 75° C., greater than 80° C., greater than 85° C., greater than 90° C., greater than 100° C., greater than 120° C., or greater than 150° C. In embodiments, the gas hydrate dissolving solution may have a flash point of from 50° C. to 150° C., from 50° C. to 120° C., from 50° C. to 100° C., from 50° C. to 90° C., from 50° C. to 85° C., from 50° C. to 80° C., from 50° C. to 75° C., from 50° C. to 70° C., from 50° C. to 65° C., from 50° C. to 60° C., from 50° C. to 55° C., from 55° C. to 150° C., from 55° C. to 120° C., from 55° C. to 100° C., from 55° C. to 90° C., from 55° C. to 85° C., from 55° C. to 80° C., from 55° C. to 75° C., from 55° C. to 70° C., from 55° C. to 65° C., from 55° C. to 60° C., from 60° C. to 150° C., from 60° C. to 120° C., from 60° C. to 100° C., from 60° C. to 90° C., from 60° C. to 85° C., from 60° C. to 80° C., from 60° C. to 75° C., from 60° C. to 70° C., from 60° C. to 65° C., from 65° C. to 150° C., from 65° C. to 120° C., from 65° C. to 100° C., from 65° C. to 90° C., from 65° C. to 85° C., from 65° C. to 80° C., from 65° C. to 75° C., from 65° C. to 70° C., from 70° C. to 150° C., from 70° C. to 120° C., from 70° C. to 100° C., from 70° C. to 90° C., from 70° C. to 85° C., from 70° C. to 80° C., from 70° C. to 75° C., from 75° C. to 150° C., from 75° C. to 120° C., from 75° C. to 100° C., from 75° C. to 90° C., from 75° C. to 85° C., from 75° C. to 80° C., from 80° C. to 150° C., from 80° C. to 120° C., from 80° C. to 100° C., from 80° C. to 90° C., from 80° C. to 85° C., from 85° C. to 150° C., from 85° C. to 120° C., from 85° C. to 100° C., from 85° C. to 90° C., from 90° C. to 150° C., from 90° C. to 120° C., from 90° C. to 100° C., from 100° C. to 150° C., from 100° C. to 120° C., or from 120° C. to 150° C. The gas hydrate dissolving solution may include sodium nitrite, ammonium chloride, a strong acid, and a weak organic acid, and have a flash point as described previously.

The gas hydrate dissolving solution may have a melting point of less than −15° C. If the gas hydrate dissolving solution includes sodium formate, the melting point may be less than −15° C., or may be approximately −16° C. If the gas hydrate dissolving solution includes sodium formate, with a melting point less than −15° C., or approximately −16° C., the gas hydrate dissolving solution may include from 10 to 30 wt. %, from 10 to 25 wt. %, from 10 to 22 wt. %, from 15 to 30 wt. %, from 15 to 25 wt. %, from 15 to 22 wt. %, from 17 to 30 wt. %, from 17 to 25 wt. %, from 17 to 22 wt. %, or approximately 20 wt. % sodium formate by a weight of the gas hydrate dissolving solution. The gas hydrate dissolving solution may have a melting point of less than −20° C. The gas hydrate dissolving solutions having a melting point of less than −20° C. may include diluted cesium formate, diluted potassium formate, or both. If the gas hydrate dissolving solution includes sodium chloride, the melting point may be less than −20° C., or may be approximately −21° C. If the gas hydrate dissolving solution includes calcium magnesium acetate, the melting point may be less than −20° C., less than −25° C., or may be approximately −28° C. The gas hydrate dissolving solution may have a melting point of less than −50° C. In embodiments, the gas hydrate dissolving solution may have a melting point of less than −15° C., less than −20° C., less than −30° C., less than −40° C., less than −50° C., less than −55° C., less than −60° C., less than −65° C., less than −70° C., less than −75° C., less than −80° C., less than −85° C., less than −90° C., less than −100° C., less than −120° C., or less than −150° C. In embodiments, the gas hydrate dissolving solution may have a melting point of from −15° C. to −150° C., from −15° C. to −120° C., from −15° C. to −100° C., from −15° C. to −90° C., from −15° C. to −85° C., from −15° C. to −80° C., from −15° C. to −75° C., from −15° C. to −70° C., from −15° C. to −65° C., from −15° C. to −60° C., from −15° C. to −55° C., from −15° C. to −50° C., from −15° C. to −40° C., from −15° C. to −30° C., from −15° C. to −25° C., from −15° C. to −20° C., from −20° C. to −200° C., from −20° C. to −120° C., from −20° C. to −100° C., from −20° C. to −90° C., from −20° C. to −85° C., from −20° C. to −80° C., from −20° C. to −75° C., from −20° C. to −70° C., from −20° C. to −65° C., from −20° C. to −60° C., from −20° C. to −55° C., from −20° C. to −50° C., from −20° C. to −40° C., from −20° C. to −30° C., from −20° C. to −25° C., from −30° C. to −300° C., from −30° C. to −120° C., from −30° C. to −100° C., from −30° C. to −90° C., from −30° C. to −85° C., from −30° C. to −80° C., from −30° C. to −75° C., from −30° C. to −70° C., from −30° C. to −65° C., from −30° C. to −60° C., from −30° C. to −55° C., from −30° C. to −50° C., from −30° C. to −40° C., from −40° C. to −400° C., from −40° C. to −120° C., from −40° C. to −100° C., from −40° C. to −90° C., from −40° C. to −85° C., from −40° C. to −80° C., from −40° C. to −75° C., from −40° C. to −70° C., from −40° C. to −65° C., from −40° C. to −60° C., from −40° C. to −55° C., from −40° C. to −50° C., from −50° C. to −150° C., from −50° C. to −120° C., from −50° C. to −100° C., from −50° C. to −90° C., from −50° C. to −85° C., from −50° C. to −80° C., from −50° C. to −75° C., from −50° C. to −70° C., from −50° C. to −65° C., from −50° C. to −60° C., from −50° C. to −55° C., from −55° C. to −150° C., from −55° C. to −120° C., from −55° C. to −100° C., from −55° C. to −90° C., from −55° C. to −85° C., from −55° C. to −80° C., from −55° C. to −75° C., from −55° C. to −70° C., from −55° C. to −65° C., from −55° C. to −60° C., from −60° C. to −150° C., from −60° C. to −120° C., from −60° C. to −100° C., from −60° C. to −90° C., from −60° C. to −85° C., from −60° C. to −80° C., from −60° C. to −75° C., from −60° C. to −70° C., from −60° C. to −65° C., from −65° C. to −150° C., from −65° C. to −120° C., from −65° C. to −100° C., from −65° C. to −90° C., from −65° C. to −85° C., from −65° C. to −80° C., from −65° C. to −75° C., from −65° C. to −70° C., from −70° C. to −150° C., from −70° C. to −120° C., from −70° C. to −100° C., from −70° C. to −90° C., from −70° C. to −85° C., from −70° C. to −80° C., from −70° C. to −75° C., from −75° C. to −150° C., from −75° C. to −120° C., from −75° C. to −100° C., from −75° C. to −90° C., from −75° C. to −85° C., from −75° C. to −80° C., from −80° C. to −150° C., from −80° C. to −120° C., from −80° C. to −100° C., from −80° C. to −90° C., from −80° C. to −85° C., from −85° C. to −150° C., from −85° C. to −120° C., from −85° C. to −100° C., from −85° C. to −90° C., from −90° C. to −150° C., from −90° C. to −120° C., from −90° C. to −100° C., from −100° C. to −150° C., from −100° C. to −120° C., or from −120° C. to −150° C. The gas hydrate dissolving solution may include sodium nitrite, ammonium chloride, a strong acid, and a weak organic acid, and have a melting point as described previously.

When the gas hydrate dissolving solution includes 2-butoxyethanol, introducing the gas hydrate dissolving solution may include introducing from 12 to 18 vol. % gas hydrate dissolving solution, based on a total volume of water within the hydrocarbon fluid in the pipeline. In embodiments, the method may include introducing from 10 to 20 vol. %, from 10 to 18 vol. %, from 10 to 16 vol. %, from 10 to 15 vol. %, from 10 to 14 vol. %, from 10 to 12 vol. %, from 12 to 20 vol. %, from 12 to 18 vol. %, from 12 to 16 vol. %, from 12 to 15 vol. %, from 12 to 14 vol. %, from 14 to 20 vol. %, from 14 to 18 vol. %, from 14 to 16 vol. %, from 14 to 15 vol. %, from 15 to 20 vol. %, from 15 to 18 vol. %, from 15 to 16 vol. %, from 16 to 20 vol. %, from 16 to 18 vol. %, or from 18 to 20 vol. % gas hydrate dissolving solution, based on a total volume of water within the hydrocarbon fluid in the pipeline.

When the gas hydrate dissolving solution includes 2-butoxyethanol, introducing the gas hydrate dissolving solution may include introducing from 1 to 8 injections of the gas hydrate dissolving solution, in which each injection is from 1 to 4 vol. % gas hydrate dissolving solution, based on a total volume of water within the hydrocarbon fluid in the pipeline. In embodiments, the method may include introducing 1, 2, 3, 4, 5, 6, 7, 8, 9, or 10 injections of the gas hydrate solution. In embodiments, the method may include introducing from 1 to 10, from 1 to 8, from 1 to 6, from 1 to 5, from 1 to 4, from 1 to 3, from 1 to 2, from 2 to 10, from 2 to 8, from 2 to 6, from 2 to 5, from 2 to 4, from 2 to 3, from 3 to 10, from 3 to 8, from 3 to 6, from 3 to 5, from 3 to 4, from 4 to 10, from 4 to 8, from 4 to 6, from 4 to 5, from 5 to 10, from 5 to 8, from 5 to 6, from 6 to 10, from 6 to 8, or from 8 to 10 injections of the gas hydrate dissolving solution. In embodiments, each injection may be from 1 to 4 vol. %, from 1 to 3 vol. %, from 1 to 2.5 vol. %, from 1 to 2 vol. %, from 2 to 4 vol. %, from 2 to 3 vol. %, from 2 to 2.5 vol. %, from 2.5 to 4 vol. %, from 2.5 to 3 vol. %, or from 3 to 4 vol. % gas hydrate dissolving solution, based on a total volume of water within the hydrocarbon fluid in the pipeline.

The gas hydrate dissolving solution may be introduced into the pipeline at an injection rate of from 0.5 to 20 gallons per minute (gal/min), from 0.5 to 15 gal/min, from 0.5 to 11 gal/min, from 0.5 to 7 gal/min, from 0.5 to 5 gal/min, from 1 to 20 gal/min, from 1 to 15 gal/min, from 1 to 11 gal/min, from 1 to 7 gal/min, from 1 to 5 gal/min, from 2 to 20 gal/min, from 2 to 15 gal/min, from 2 to 11 gal/min, from 2 to 7 gal/min, from 2 to 5 gal/min, from 3 to 20 gal/min, from 3 to 15 gal/min, from 3 to 11 gal/min, from 3 to 7 gal/min, or from 3 to 5 gal/min.

The gas hydrate dissolving solution may include an aqueous solution including the glycol, dimethylformamide, or both. The gas hydrate dissolving solution may include an aqueous solution including the cesium formate, potassium formate, or both. The gas hydrate dissolving solution may include an aqueous solution including the cesium formate, potassium formate, sodium formate, potassium acetate, sodium chloride, calcium chlorides, magnesium chloride, sodium acetate, calcium magnesium acetate, calcium nitrate, calcium nitrate, magnesium nitrate, calcium magnesium nitrate, potassium carbonates, carbamide (available from Urea Solutions), sodium lactate; potassium lactate; a mixture of sodium lactate and potassium lactate; a hydroxyl-containing organic compounds in combination with sodium lactate, potassium lactate and/or potassium acetate; a mixture of sodium lactate and/or potassium lactate with potassium acetate; or potassium carbonate, ammonium carbonate, ammonium carbamate, ammonium acetate, or combinations thereof. The gas hydrate dissolving solution may include an aqueous solution including the alkali and alkaline earth metal salts including formates, lactates, acetates, carbonates, chlorides, or combinations thereof. The gas hydrate dissolving solution may include an aqueous solution including the ammonium salts such as ammonium acetate, carbonate, carbamate, or combinations thereof.

The aqueous phase may include at least one of fresh water, salt water, brine, municipal water, formation water, produced water, well water, filtered water, distilled water, sea water, or combinations thereof. The brine may include at least one of natural and synthetic brine, such as saturated brine or formate brine. The aqueous phase may use water containing organic compounds or salt. Without being bound by any particular theory, salt or other organic compounds may be incorporated into the aqueous phase to control the density of the gas hydrate dissolving solution. Suitable salts include but are not limited to alkali metal chlorides, hydroxides, lactates, carbonates, nitrates, acetates, formates or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous phase.

In some embodiments, the gas hydrate dissolving solution may contain from 10 weight percent (wt. %) to 70 wt. % of the aqueous phase based on the total weight of the gas hydrate dissolving solution. In some embodiments, the gas hydrate dissolving solution may contain from 28 pounds per barrel (lb/bbl) to 630 lbs/bbl, such as from 30 to 600 lbs/bbl, from 50 to 500 lbs/bbl, from 100 to 500 lb/bbl, 200 to 500 lbs/bbl, or 300 to 600 lbs/bbl of the aqueous phase.

As stated previously, the method includes allowing the gas hydrate dissolving solution to at least partially dissolve the gas hydrate in the pipeline. The gas hydrate dissolving solution may at least partially dissolve the gas hydrate in the pipeline in less than 10 hours, less than 8 hours, less than 7 hours, less than 6 hours, less than 5 hours, less than 4 hours, less than 3 hours, less than 2 hours, or less than 1 hour. In embodiments, the gas hydrate dissolving solution may at least partially dissolve the gas hydrate in the pipeline in from 1 to 10 hours, from 1 to 8 hours, from 1 to 7 hours, from 1 to 6 hours, from 1 to 5 hours, from 1 to 4 hours, from 1 to 3 hours, from 1 to 2 hours, from 2 to 10 hours, from 2 to 8 hours, from 2 to 7 hours, from 2 to 6 hours, from 2 to 5 hours, from 2 to 4 hours, from 2 to 3 hours, from 3 to 10 hours, from 3 to 8 hours, from 3 to 7 hours, from 3 to 6 hours, from 3 to 5 hours, from 3 to 4 hours, from 4 to 10 hours, from 4 to 8 hours, from 4 to 7 hours, from 4 to 6 hours, from 4 to 5 hours, from 5 to 10 hours, from 5 to 8 hours, from 5 to 7 hours, from 5 to 6 hours, from 6 to 10 hours, from 6 to 8 hours, from 6 to 7 hours, from 7 to 10 hours, from 7 to 8 hours, or from 8 to 10 hours.

The method may further include heating the gas hydrate dissolving solution prior to introducing the gas hydrate dissolving solution into the pipeline. The gas hydrate dissolving solution may be heated to at least 100° F., at least 125° F., at least 150° F., at least 175° F., at least 200° F., at least 225° F., at least 250° F., at least 275° F., at least 300° F., or at least 350° F. In embodiments, the gas hydrate dissolving solution may be heated to from 100° F. to 350° F., from 100° F. to 300° F., from 100° F. to 275° F., from 100° F. to 250° F., from 100° F. to 225° F., from 100° F. to 200° F., from 100° F. to 175° F., from 100° F. to 150° F., from 100° F. to 125° F., from 125° F. to 350° F., from 125° F. to 300° F., from 125° F. to 275° F., from 125° F. to 250° F., from 125° F. to 225° F., from 125° F. to 225° F., from 125° F. to 200° F., from 125° F. to 175° F., from 125° F. to 150° F., from 150° F. to 350° F., from 150° F. to 300° F., from 150° F. to 275° F., from 150° F. to 250° F., from 150° F. to 225° F., from 150° F. to 200° F., from 150° F. to 175° F., from 175° F. to 350° F., from 175° F. to 300° F., from 175° F. to 275° F., from 175° F. to 250° F., from 175° F. to 225° F., from 175° F. to 200° F., from 200° F. to 350° F., from 200° F. to 300° F., from 200° F. to 275° F., from 200° F. to 250° F., from 200° F. to 225° F., from 225° F. to 350° F., from 225° F. to 300° F., from 225° F. to 275° F., from 225° F. to 250° F., from 250° F. to 350° F., from 250° F. to 300°

F., from 250° F. to 275° F., from 275° F. to 350° F., from 275° F. to 300° F., or from 300° F. to 350° F.

The method may further include inhibiting gas hydrate formation in the pipeline after introducing the gas hydrate dissolving solution. After melting and dissolving the gas hydrate plug in the pipeline, the hydrate dissolving solution may alter the thermodynamic properties of the fluid system by adsorbing the water within the hydrocarbon fluid. Without intending to be bound by theory, this may decrease the temperature and increase the pressure required to form gas hydrates within the fluid system of the pipeline, inhibiting gas hydrate formation in the pipeline. In embodiments, the temperature in the pipeline may increase after the gas hydrate dissolving solution is introduced. The temperature in the pipeline may be from 20° C. to 120° C., from 20° C. to 110° C., from 20° C. to 100° C., from 20° C. to 80° C., from 20° C. to 60° C., from 20° C. to 40° C., from 40° C. to 120° C., from 40° C. to 110° C., from 40° C. to 100° C., from 40° C. to 80° C., from 40° C. to 60° C., from 60° C. to 120° C., from 60° C. to 110° C., from 60° C. to 100° C., from 60° C. to 80° C., from 80° C. to 120° C., from 80° C. to 110° C., from 80° C. to 100° C., from 100° C. to 120° C., from 100° C. to 110° C., or from 110° C. to 120° C. after the gas hydrate dissolving solution is introduced.

The gas hydrate dissolving solution may include additional additives such as corrosion inhibitors, scale inhibitors, demulsifier surfactants, gas hydrate inhibitors, or combinations thereof. These additional additives may prevent corrosion, scaling, emulsion formation, gas hydrate formation, or combinations thereof.

The gas hydrate dissolving solution may be introduced into a wellbore or introduced into a pipeline. The pipeline may be a surface pipeline or a subsurface pipeline. In embodiments, the surface pipeline may be a transportation pipeline used to transport a hydrocarbon stream from a wellbore to hydrocarbon upgrading equipment such as a separator. The gas hydrate dissolving solution may be introduced by a well head, valves on the well head, an injection port in the well head, or by using back-side pumps. In embodiments, the gas hydrate dissolving solution may be introduced upstream of the gas hydrate. In embodiments, the gas hydrate dissolving solution may be introduced downstream of the gas hydrate.

The method may further include allowing the dissolved gas hydrate to discharge from the pipeline after allowing the gas hydrate dissolving solution to at least partially dissolve the gas hydrate in the pipeline.

Examples

Various embodiments of the gas hydrate dissolving solution as described in this disclosure are tested in the examples below. The gas hydrate dissolution was tested under wellhead conditions.

A gas hydrate visual cell was used to study the formation and dissolution of gas hydrate under real wellhead conditions. The water mixed with gas was 90 vol. % fresh water and 10 vol. % formation brine. The visual cell was capable of measuring torque during mixing gas and brines as well as while injecting the dissolver/inhibitor package. When no gas hydrate is present, the torque will measure normal values. When a gas hydrate forms in the cell, the torque will increase until the stirrer is not able to continue mixing. The visual cell has a capacity of 875 mL. Only 10 to 15 vol. % of the cell is filled with the water mixture to be tested. The remaining of the cell will be filled with the same field gas composition until the cell pressure is achieved (4000-5000 psi).

The hydrocarbon gas mixture used in each testing had the following composition:

TABLE 1

| Hydrocarbon gas mixture composition in weight percent (wt. %) | | | | | | | | | | | | | |
|---|---|---|---|---|---|---|---|---|---|---|---|---|---|
| $C_1$ | $C_2$ | $C_3$ | $iC_4$ | $iC_5$ | $C_6$ | $C_7$ | $C_8$ | $C_9$ | $CO_2$ | $H_2S$ | $N_2$ | $nC_4$ | $nC_5$ |
| 84.24 | 4.71 | 1.39 | 0.28 | 0.19 | 0.22 | 0.18 | 0.12 | 0.04 | 2.36 | 0 | 5.68 | 0.43 | 0.16 |

The water used in each experiment was 90 vol. % fresh water and 10 vol. % formation brine. The formation brine used in each testing had the following composition:

TABLE 2

| Formation brine mixture composition in parts per million (ppm) | | | | | | | | |
|---|---|---|---|---|---|---|---|---|
| | Na | Ca | Mg | $SO_4$ | Cl | TDS | Ba | Sr |
| Sample #1 | 47,000 | 31,700 | 1,220 | 236 | 132,000 | 212,156 | 2,239 | 2,200 |
| Sample #2 | 51,600 | 31,900 | 1,400 | 249 | 140,000 | 225,149 | 2,647 | 2,891 |

In Table 2, TDS refers to the total dissolved solids. Additionally, the pH of Sample #1 was 3.9 and the pH of Sample #2 was 3.2.

The visual cell used in the following examples measured the torque in the cell including the gas hydrate where the hydrocarbon gas, water and brine solution, and the gas hydrate dissolving solution were injected. When gas hydrate forms, the torque increases, and when the gas hydrate dissolves, the torque returns to pre-formation values. The following experiments were conducted by using the general process steps shown in Table 3.0

TABLE 3

| | Visual Cell Testing Procedure |
|---|---|
| 1 | Preparing the gas hydrate dissolving solution and the water and brine solution |
| 2 | Setting the visual cell to a temperature of 100° F. |
| 3 | Adding 120 mL brine to the visual cell |
| 4 | Adding the hydrocarbon gas to the visual cell until a pressure of 4500 psi was achieved |
| 5 | Mixing and measuring the torque |
| 6 | Cooling the visual cell until a gas hydrate forms (indicated by an increase in torque and a decrease in pressure) |
| 7 | Adding gas hydrate dissolving solution |
| 8 | Wait for 2 hours |
| 9 | Mixing and measuring the torque |
| 10 | Continue adding gas hydrate dissolving solution until the gas hydrate is dissolved (indicated by a return of torque values to pre-gas hydrate formation values) |

Comparative Example 1

Comparative Example 1 includes the use of methanol as the gas hydrate dissolving solution as a basis of comparison to the gas hydrate dissolving solutions described in this disclosure. Comparative Example 1 was conducted using the steps shown in Table 4.

TABLE 4

Comparative Example 1 Testing Procedure

1. Add synthetic DI/brine (90:10) in the cell. Evacuate the cell and purge it with gas mixture to 4,500 psi and heat it up to the temperature of 100° F.
2. Mix for 2 hours at 400 rpm to make fluids fully saturated with gas. Record video every 1 hour for the duration of 2 minutes from the bottom and side cameras (1 minute each).
3. Stop the mixing and allow fluids to separate over 30 minutes to aid in visual observation. Record video every 15 minutes for the duration of 2 minutes from the bottom and side cameras (1 minute each).
4. Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each).
5. Once 40° F. is stabilized, keep mixing at 400 rpm and 50° F. for 10 hours. Record video every 1 hour for the duration of 2 minutes from the bottom and side cameras (1 minute each).
6. Stop mixing and shut in the cell at 50° F. for 10 hours. Record video every 1 hour for the duration of 2 minutes from the bottom and side cameras (1 minute each).
7. Add 10 vol. % methanol and start mixing with 400 rpm for 2 hours. Record video every 30 minutes for the duration of 2 minutes from the bottom and side cameras (1 minute each).
8. If the torque recorded did not decrease to normal, repeat step 7 with adding methanol in 10 vol. % injections.
9. After the hydrate plug has been dissolved and plugging is cleared, heat the cell from 50 to 100° F. over a span of 5 hrs. Record video every 1 hour for the duration of 2 minutes from the bottom and side cameras (1 minute each).

The testing for Comparative Example 1 was performed at a constant volume starting at 4500 psi. FIG. 1 shows the temperature, pressure and torque graph over time for Comparative Example 1. As shown in FIG. 1, during the cooling step from 100° F. to 50° F., the pressure decreased to 3250 psi at a constant volume. Meanwhile the torque remained in the level of 10 oz-in. However during the following mixing steps, the torque continued to increase until it exceeded the maximum operating torque, meaning that a gas hydrate was formed. The torque decreased to the initial torque value when methanol concentration increased to around 30%.

Example 1 includes the use of diethylene glycol monoethyl ether (DEGEE) as the gas hydrate dissolving solution as described in this disclosure. Example 1 was conducted using the steps shown in Table 5.

Figure 2:
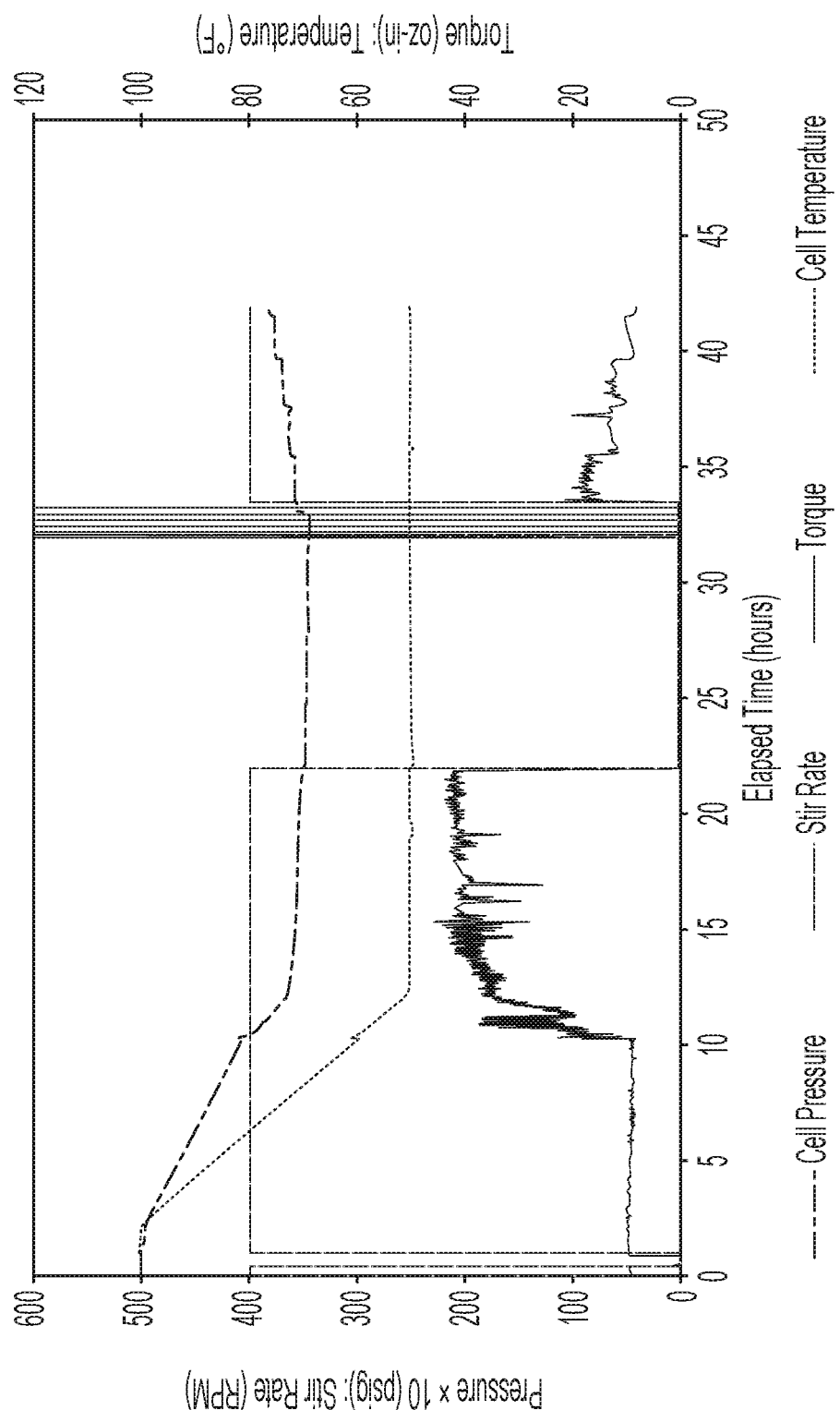
FIG. 2 graphically depicts the relationship between temperature, pressure, and torque (y-axis) and time (x-axis) during a gas hydrate experiment, according to one or more embodiments described in this disclosure.

FIG. 2 shows the temperature, pressure and torque graph over time for Example 1. Referring to FIG. 2, gas hydrates began to form at approximately 60° F. and 4060 psig. The hydrates never over torqued the mixer during the cool down and 10 hour mixing stage at 50° F. After the 10 hour shut-in phase the mixer was restarted and the hydrate plug over torqued the mixer during a 1 hour period. A 10 vol. % of DEGEE was injected and after 30 minutes the mixer was able to move the hydrate plug and a torque of 17-18 oz-in. was recorded. Then, 4 injections of 5 vol. % DEGEE were introduced into the visual cell for a total volume of 30 vol. %. Each additional injection lowered the torque until the torque returned to its original value.

TABLE 5

Example 1 Testing Procedure

1. Add synthetic DI/brine (90:10) in the cell. Evacuate the cell and purge it with gas mixture to 4,500 psi and heat it up to the temperature of 100° F.
2. Mix for 2 hours at 400 rpm to make fluids fully saturated with gas. Record video every 1 hour for the duration of 2 minutes from the bottom and side cameras (1 minute each).
3. Stop the mixing and allow fluids to separate over 30 minutes to aid in visual observation. Record video every 15 minutes for the duration of 2 minutes from the bottom and side cameras (1 minute each).
4. Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each).
5. Once 40° F. is stabilized, keep mixing at 400 rpm and 50° F. for 10 hours. Record video every 1 hour for the duration of 2 minutes from the bottom and side cameras (1 minute each).
6. Stop mixing and shut in the cell at 50° F. for 10 hours. Record video every 1 hour for the duration of 2 minutes from the bottom and side cameras (1 minute each).
7. Add 10 vol. % DEGEE and start mixing with 400 rpm for 2 hours. Record video every 30 minutes for the duration of 2 minutes from the bottom and side cameras (1 minute each).
8. If the torque recorded did not decrease to normal, repeat step 7 with adding DEGEE in 10 vol. % injections.
9. After the hydrate plug has been dissolved and plugging is cleared, heat the cell from 50 to 100° F. over a span of 5 hrs. Record video every 1 hour for the duration of 2 minutes from the bottom and side cameras (1 minute each).

Example 2 includes the use of 2-butoxyethanol as the gas hydrate dissolving solution as described in this disclosure. Example 2 was conducted using the steps shown in Table 6.

TABLE 6

Example 2 Testing Procedure

1 Add synthetic DI/brine (90:10) in the cell. Evacuate the cell and purge it with gas mixture to 4,500 psi and heat it up to the temperature of 100° F.
2 Mix for 2 hours at 400 rpm to make fluids fully saturated with gas. Record video every 1 hour for the duration of 2 minutes from the bottom and side cameras (1 minute each).
3 Stop the mixing and allow fluids to separate over 30 minutes to aid in visual observation. Record video every 15 minutes for the duration of 2 minutes from the bottom and side cameras (1 minute each).
4 Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each).
5 Once 40° F. is stabilized, keep mixing at 400 rpm and 50° F. for 10 hours. Record video every 1 hour for the duration of 2 minutes from the bottom and side cameras (1 minute each).
6 Stop mixing and shut in the cell at 50° F. for 10 hours. Record video every 1 hour for the duration of 2 minutes from the bottom and side cameras (1 minute each).
7 Add 2.5 vol. % 2-butoxyethanol and start mixing with 400 rpm for 2 hours. Record video every 30 minutes for the duration of 2 minutes from the bottom and side cameras (1 minute each).
8 If the torque recorded did not decrease to normal, repeat step 7 with adding 2-butoxyethanol in 2.5 vol. % injections.
9 After the hydrate plug has been dissolved and plugging is cleared, heat the cell from 50 to 100° F. over a span of 5 hrs. Record video every 1 hour for the duration of 2 minutes from the bottom and side cameras (1 minute each).

Figure 3:
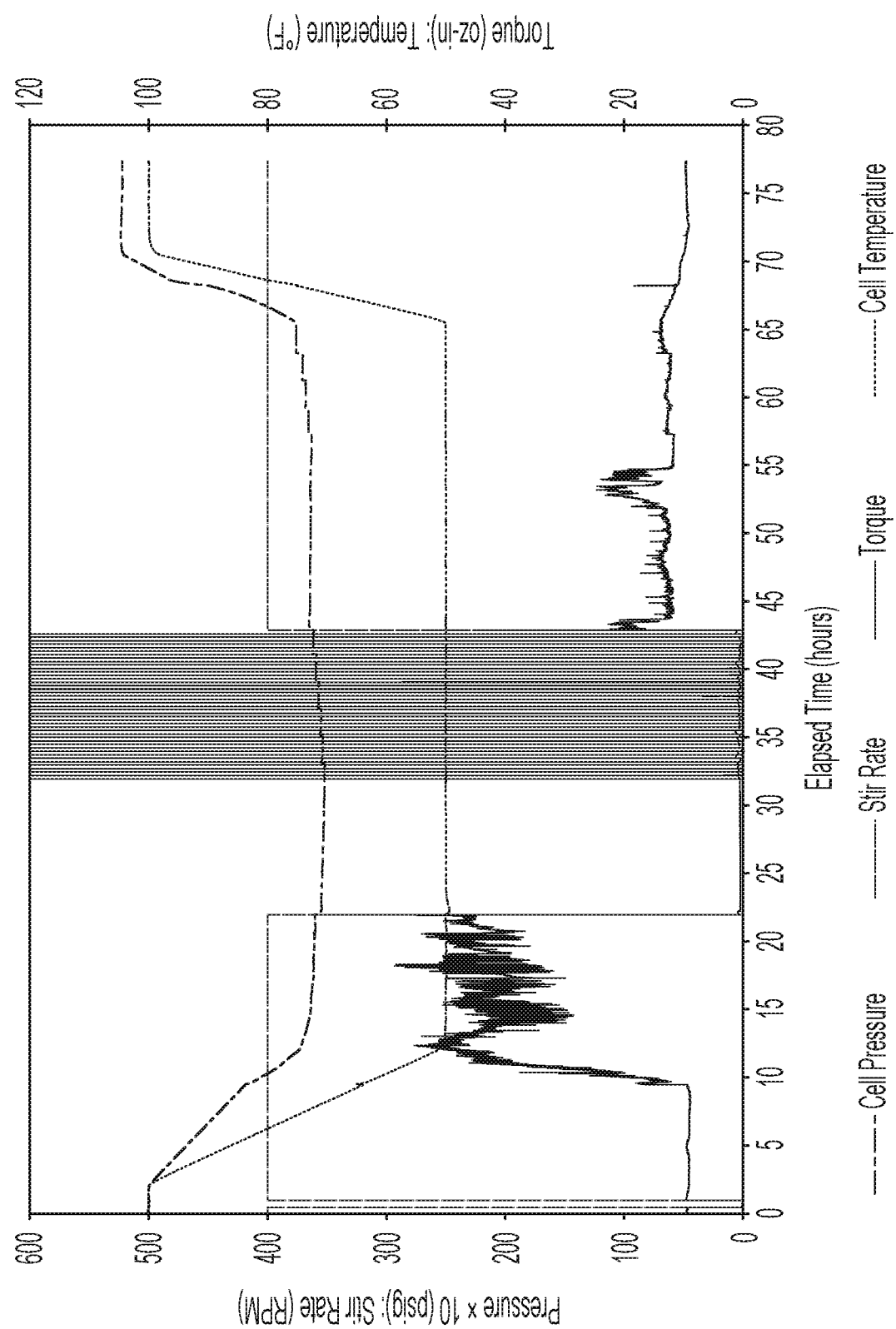
FIG. 3 graphically depicts the relationship between temperature, pressure, and torque (y-axis) and time (x-axis) during a gas hydrate experiment, according to one or more embodiments described in this disclosure.

FIG. 3 shows the temperature, pressure and torque graph over time for Example 2. Referring to FIG. 3, gas hydrates began to form during the cool down ramp at a pressure of 4189 psi and 68.3° F. Torque response varied between 40-50 oz-in during the remaining period of ramping and the 10 hour hold with mixing at 50° F. After the 10 hour shut-in period, a hydrate plug had formed and the motor over torqued at restart of mixing. After an hour, the first chemical injection of 2.5% (3 ml) was introduced. 4 additional injections of 2.5 vol. % 2-butoxyethanol were then introduced into the visual cell. At approximately 1.5 hours after the 5th injection (12.5 vol. %) the hydrate plug began to breakdown and the mixer established constant rotation at 400 rpm. The resulting torque averaged 20 oz-in. A 6th injection was performed and torque dropped to 12-13 oz-in. The system was maintained at this condition overnight. Four additional chemical volumes of 2.5% each (for a total test volume of 25%) were injected the following morning with little effect to torque response.

Example 3 includes the use of potassium formate as the gas hydrate dissolving solution as described in this disclosure. Example 3 was conducted using the steps shown in Table 7.

TABLE 7

Example 3 Testing Procedure

1 Add synthetic DI/brine (90:10) in the cell. Evacuate the cell and purge it with gas mixture to 4,500 psi and heat it up to the temperature of 100° F.
2 Mix for 2 hours at 400 rpm to make fluids fully saturated with gas. Record video every 1 hour for the duration of 2 minutes from the bottom and side cameras (1 minute each).
3 Stop the mixing and allow fluids to separate over 30 minutes to aid in visual observation. Record video every 15 minutes for the duration of 2 minutes from the bottom and side cameras (1 minute each).
4 Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each).
5 Once 50° F. is stabilized, keep mixing at 400 rpm and 50° F. for 10 hours. Record video every 1 hour for the duration of 2 minutes from the bottom and side cameras (1 minute each).
6 Stop mixing and shut in the cell at 50° F. for 10 hours. Record video every 1 hour for the duration of 2 minutes from the bottom and side cameras (1 minute each).
7 Add 10 vol. % potassium formate and start mixing with 400 rpm for 2 hours. Record video every 30 minutes for the duration of 2 minutes from the bottom and side cameras (1 minute each).
8 If the torque recorded did not decrease to normal, repeat step 7 with adding potassium formate in 5 vol. % injections.
9 After the hydrate plug has been dissolved and plugging is cleared, heat the cell from 50 to 100° F. over a span of 5 hrs. Record video every 1 hour for the duration of 2 minutes from the bottom and side cameras (1 minute each).

Figure 4:
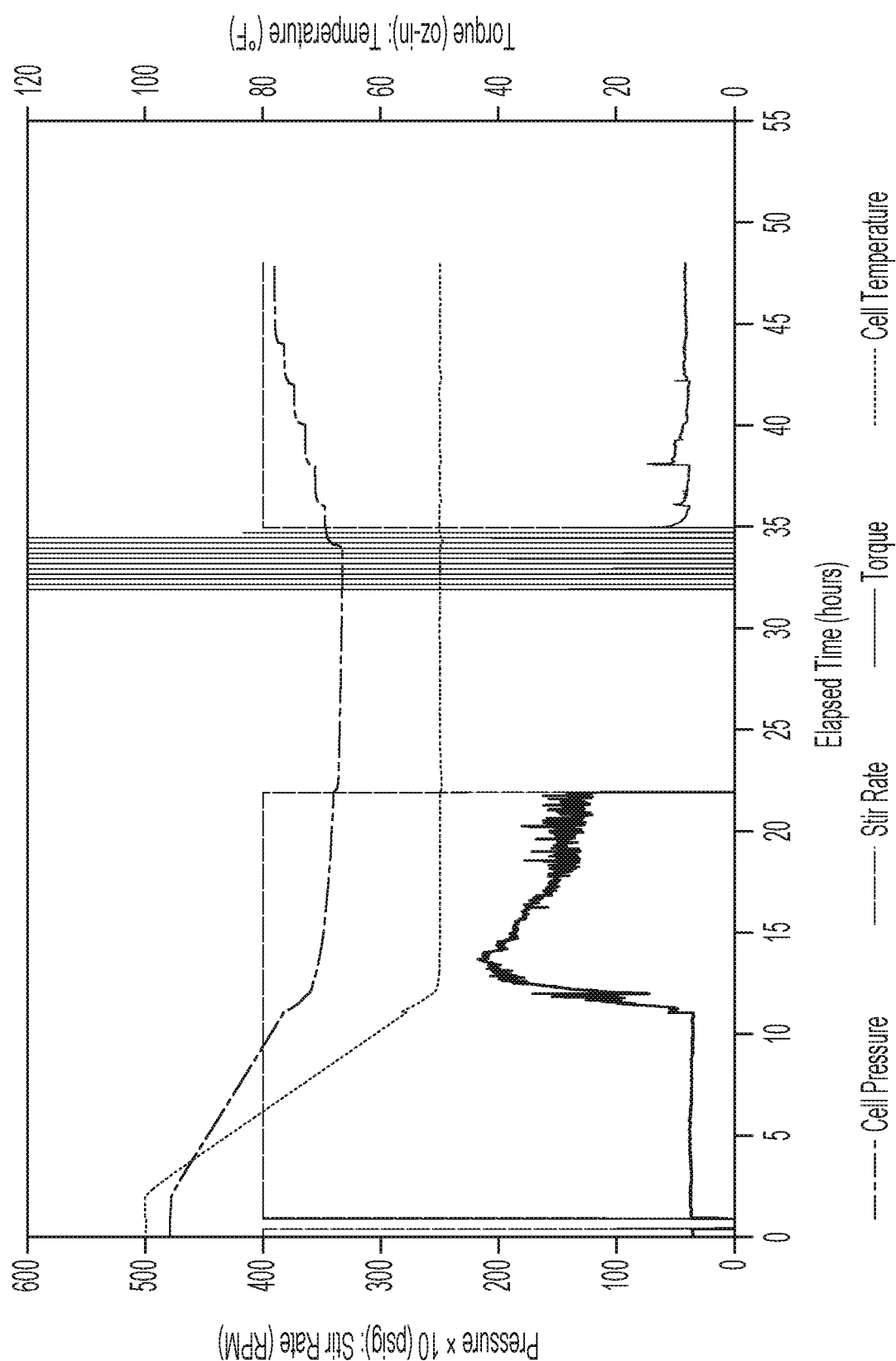
FIG. 4 graphically depicts the relationship between temperature, pressure, and torque (y-axis) and time (x-axis) during a gas hydrate experiment, according to one or more embodiments described in this disclosure.

FIG. 4 shows the temperature, pressure and torque graph over time for Example 3. Referring to FIG. 4, gas hydrates began to form at approximately 55.7° F. and 3826 psig. The hydrates never over torqued the mixer during the cool down and 10 hour mixing stage at 50° F. After the 10 hour shut-in phase the mixer was restarted and the hydrate plug over torqued the mixer during a 2 hour period; with restart attempts every 15 minutes. A 10% volume of potassium formate was injected, followed by 4 injections of 5 vol. % (duplicating the process of Example 1) and after 1 hour the mixer was able to move the hydrate plug with an initial torque of 26.4 oz-in. was recorded. After approximately 30 minutes of mixing the torque had dropped to pre-hydrate values.

Example 4 includes the use of potassium formate heated to 250° F. as the gas hydrate dissolving solution as described in this disclosure. Example 4 was conducted using the steps shown in Table 8.

TABLE 8

Example 4 Testing Procedure

1 Add synthetic DI/brine (90:10) in the cell. Evacuate the cell and purge it with gas mixture to 4,500 psi and heat it up to the temperature of 100° F.
2 Mix for 2 hours at 400 rpm to make fluids fully saturated with gas. Record video every 1 hour for the duration of 2 minutes from the bottom and side cameras (1 minute each).
3 Stop the mixing and allow fluids to separate over 30 minutes to aid in visual observation. Record video every 15 minutes for the duration of 2 minutes from the bottom and side cameras (1 minute each).
4 Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each).
5 Once 50° F. is stabilized, keep mixing at 400 rpm and 50° F. for 10 hours. Record video every 1 hour for the duration of 2 minutes from the bottom and side cameras (1 minute each).
6 Stop mixing and shut in the cell at 50° F. for 10 hours. Record video every 1 hour for the duration of 2 minutes from the bottom and side cameras (1 minute each).
7 Add 2.5 vol. % heated potassium formate and start mixing with 400 rpm for 2 hours. Record video every 30 minutes for the duration of 2 minutes from the bottom and side cameras (1 minute each).
8 If the torque recorded did not decrease to normal, repeat step 7 with adding heated potassium formate in 2.5 vol. % injections.
9 After the hydrate plug has been dissolved and plugging is cleared, heat the cell from 50 to 100° F. over a span of 5 hrs. Record video every 1 hour for the duration of 2 minutes from the bottom and side cameras (1 minute each).

Figure 5:
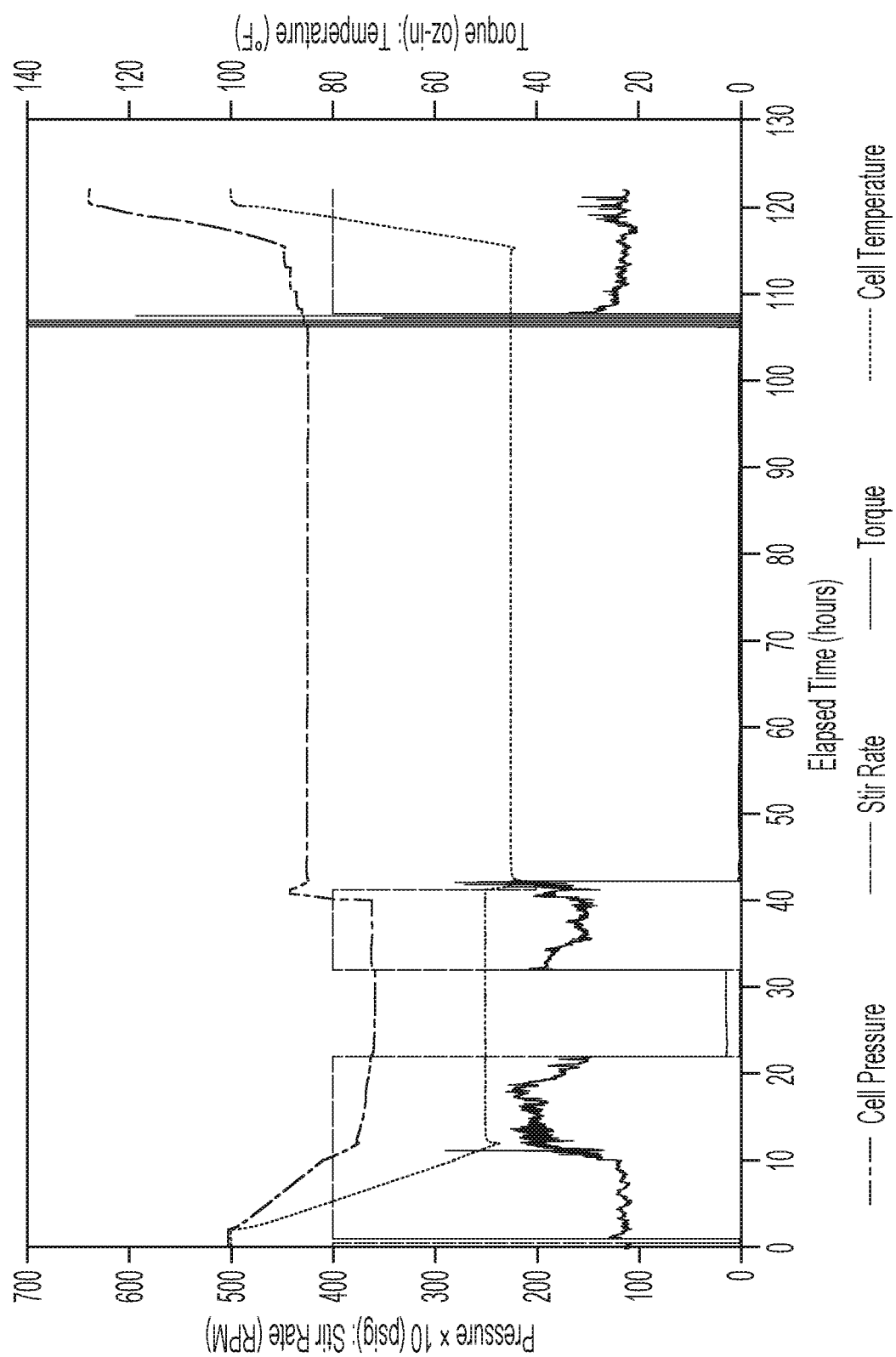
FIG. 5 graphically depicts the relationship between temperature, pressure, and torque (y-axis) and time (x-axis) during a gas hydrate experiment, according to one or more embodiments described in this disclosure.

FIG. 5 shows the temperature, pressure and torque graph over time for Example 4. Referring to FIG. 5, gas hydrates began to form during the cooling ramp at 4095 psig and 56° F. Torque increased from approximately 22-23 oz-in up to 40-45 oz-in during the completion of the cooling ramp and 10 hour mixing period at 50° F. After the 10 hour hold period, mixing was started and a torque of 40 oz-in was recorded. Torque declined and stabilized at 30-32 oz-in over the next eight hours. Chemical injection was not performed due to the lack of a hydrate plug. To achieve a hydrate plug the cell pressure was increased by injection of additional gas from 3620 psig to 4400 psig. Cell temperature was lowered from 50° F. to 45° F. and the system was held at these conditions over the weekend period. The following Monday morning the mixer was started and immediately over torqued indicating a hydrate plug had formed. The first injection of 2.5 vol. % potassium formate at a temperature of 250° F. was performed. For the first one hour and 15 minutes the mixer continued to over torque. After one hour and 30 minutes the hydrate plug broke and mixing was established with a torque recorded at 35 oz-in. The second injection took place 30 minutes later and torque dropped to 25 oz-in. The third injection lowered the torque to approximately 22 oz-in, matching the initial torque at the beginning of the test. A fourth injection had no additional reduction in torque and the test was terminated. All injections were at 2.5 vol. %.

Example 5 includes the use of $NH_4Cl$, $NaNO_2$, $CH_3COOH$, and HCl as the gas hydrate dissolving solution as described in this disclosure. Example 5 was conducted using the steps shown in Table 9.

TABLE 9

Example 5 Testing Procedure

1 Add 120 mL of synthetic DI/brine (90:10) in the cell (where the total cell volume is approximately 875 mL). Evacuate the cell and purge it with gas mixture to 4,500 psi and heat it up to the temperature of 100° F.
2 Mix for 2 hours at 400 rpm to make fluids fully saturated with gas. Record video every 1 hour for the duration of 2 minutes from the bottom and side cameras (1 minute each).
3 Stop the mixing and allow fluids to separate over 30 minutes to aid in visual observation. Record video every 15 minutes for the duration of 2 minutes from the bottom and side cameras (1 minute each).
4 Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each).

TABLE 9-continued

Example 5 Testing Procedure

5 Once 50° F. is stabilized, keep mixing at 400 rpm and 50° F. for 10 hours. Record video every 1 hour for the duration of 2 minutes from the bottom and side cameras (1 minute each).
6 Stop mixing and shut in the cell at 50° F. for 10 hours. Record video every 1 hour for the duration of 2 minutes from the bottom and side cameras (1 minute each).
7 Add 30 mL of $NH_4Cl$ (25 vol.% with respect to the volume of water in the cell), 30 mL of $NaNO_2$ (25 vol. % with respect to the volume of water in the cell), 2 mL of 10 wt. % $CH_3COOH$ (1.67 vol. % with respect to the volume of water in the cell), and 1 mL of 15 wt. % HCl (0.83 vol. % with respect to the volume of water in the cell), and start mixing with 400 rpm for 2 hours. Record video every 30 minutes for the duration of 2 minutes from the bottom and side cameras (1 minute each).
8 If the torque recorded did not decrease to normal, repeat step 7 by injecting 25 vol. % $NH_4Cl$ and 25 vol. % $NaNO_2$ with respect to the volume of water in the cell. However, in this Example, additional injections were not necessary because the torque decreased to normal.
9 After the hydrate plug has been dissolved and plugging is cleared, heat the cell from 50 to 100° F. over a span of 5 hrs. Record video every 1 hour for the duration of 2 minutes from the bottom and side cameras (1 minute each).

Figure 6:
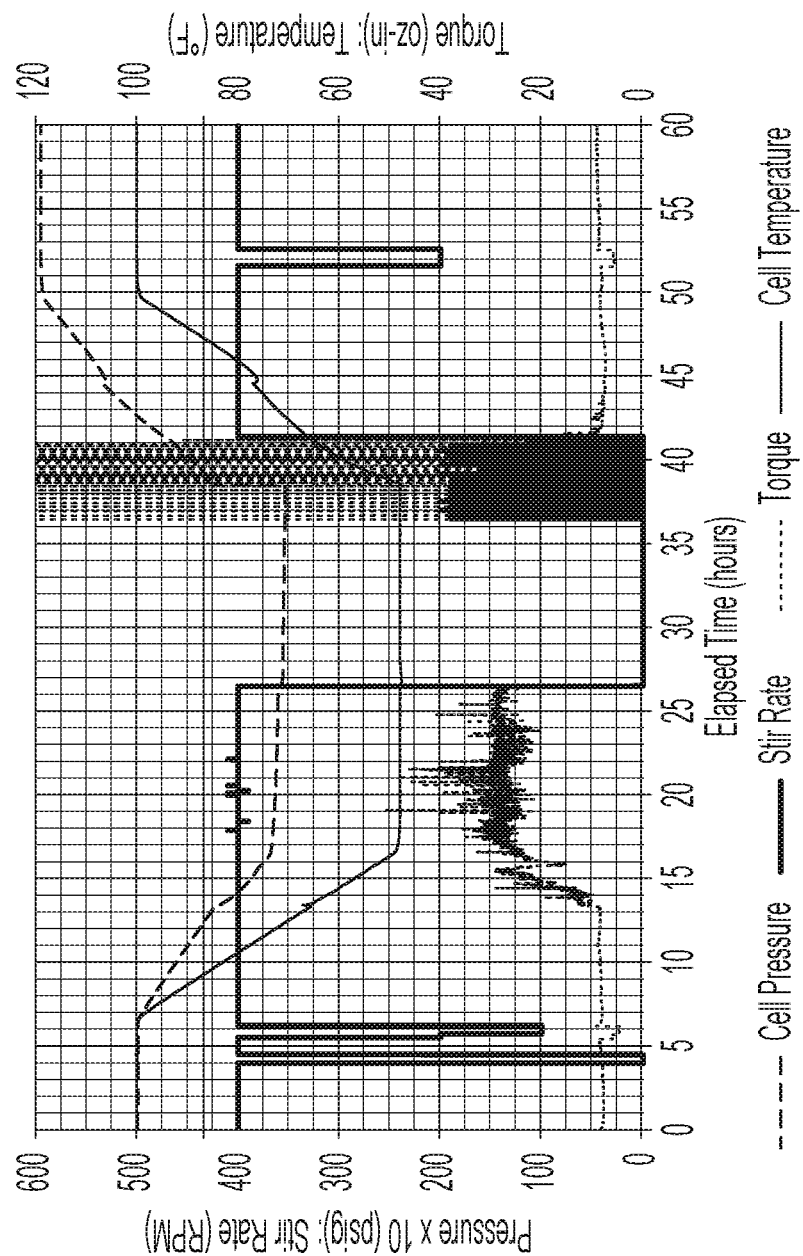
FIG. 6 graphically depicts the relationship between temperature, pressure, and torque (y-axis) and time (x-axis) during a gas hydrate experiment, according to one or more embodiments described in this disclosure.

FIG. 6 shows the temperature, pressure and torque graph over time for Example 5. Referring to FIG. 6, a hydrate plug was formed at approximately 48° F. and 3550 psig, and the cell chiller was turned off just prior to the chemical injections. Both chemicals were injected simultaneously from the top of the cell; 30 ml of $NH_4Cl$, 30 ml of $NaNO_2$, 2 ml of $CH_3COOH$, and 1 ml of HCl, over a three minute period. The cell was allowed to self-heat after the chemical injection for 5 hours. The hydrates melted about 5 hours after introduction of the gas hydrate dissolving solution and mixing resumed when the cell temperature reached approximately 66° F. The circulating bath was restarted at approximately 76° F., and the cell was ramped back to 100° F.

Figure 7:
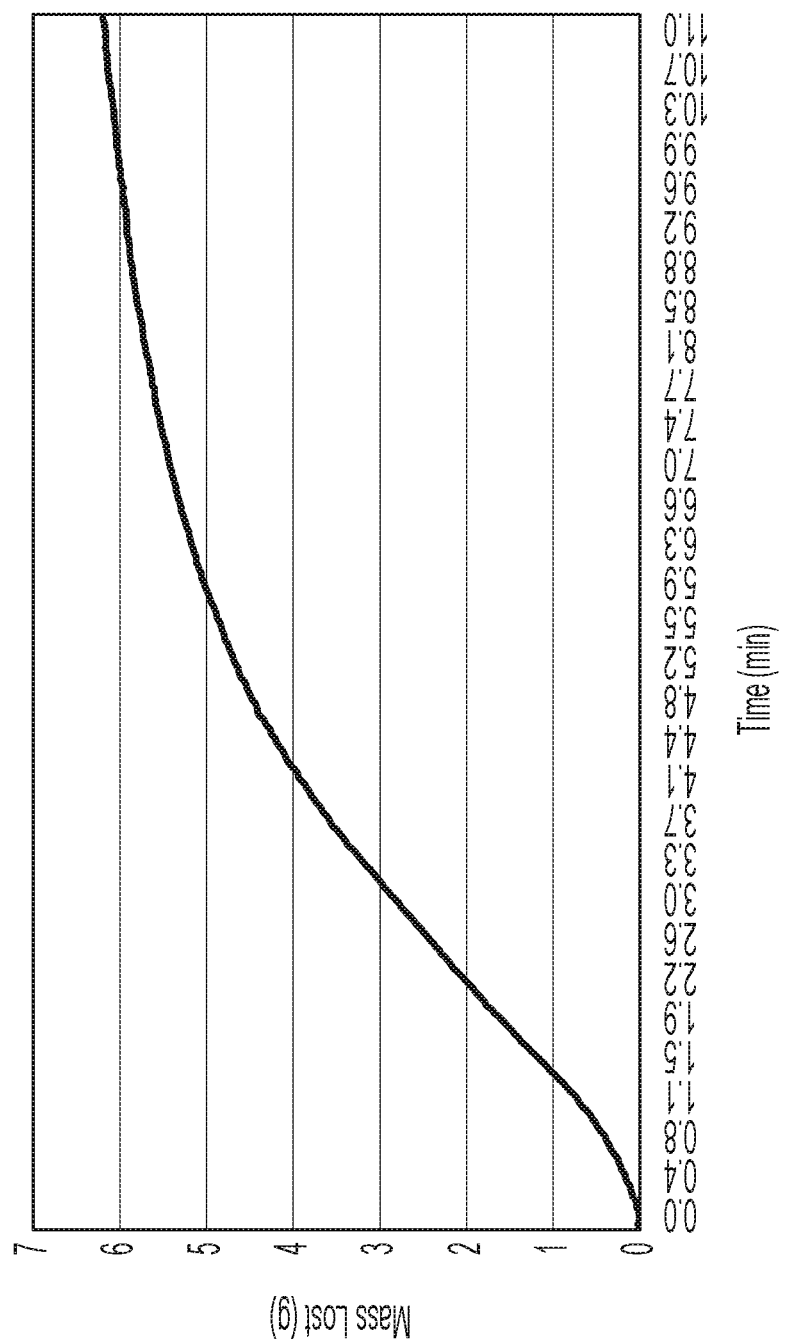
FIG. 7 graphically depicts the relationship between mass lost (y-axis) and time (x-axis) during a chemical reaction, according to one or more embodiments described in this disclosure.

The heat generating reaction between sodium nitrite and ammonium chloride was then shown in Example 6. 30 mL of a 5 molar solution of $NH_4Cl$, 30 mL of a 5 molar solution of $NaNO_2$, 2 mL of 10 wt. % $CH_3COOH$, and 1 mL of 15 wt. % HCl were combined yielding the chemical reaction $NH_4Cl + NaNO_2 \rightarrow NaCl + 2H_2O + N_2$, where $\Delta H = 309.6 \pm 16.7$ kJ/mol. The reaction produced 0.15 mol (4.2 grams) of $N_2$. No ice was used in this reaction. The mass lost over time in Example 6 is shown in FIG. 7. About 6 grams of mass was lost over 11 minutes, partially due to the evaporation of water, since the heat was produced quickly, and was close to the boiling point of water.

Figure 8:
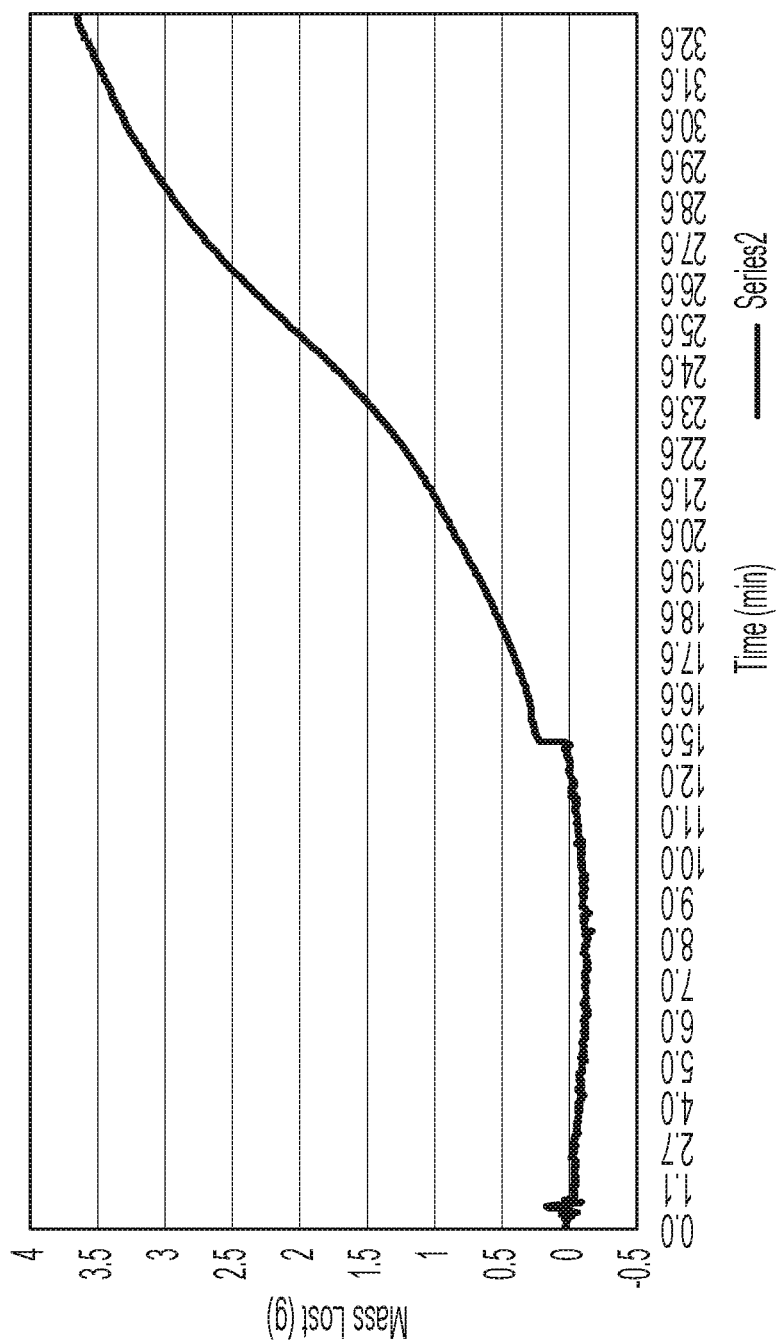
FIG. 8 graphically depicts the relationship between mass lost (y-axis) and time (x-axis) during a chemical reaction, according to one or more embodiments described in this disclosure.

The heat generating reaction between sodium nitrite and ammonium chloride in the presence of ice was then shown in Example 7. 30 mL of a 5 molar solution of $NH_4Cl$, 30 mL of a 5 molar solution of $NaNO_2$, 2 mL of 15 wt. % HCl, and 30 grams of ice were combined, yielding the chemical reaction $NH_4Cl + NaNO_2 \rightarrow NaCl + 2H_2O + N_2$, where $\Delta H = 309.6 \pm 16.7$ kJ/mol. The reaction produced 0.15 mol (4.2 grams) of $N_2$. The mass lost over time in Example 7 is shown in FIG. 8. About 3.5 grams of mass was lost over about 30 minutes. Overall, less mass was lost in Example 7, due to the presence of the ice, as compared to Example 6, which did not include ice.

Figure 9:
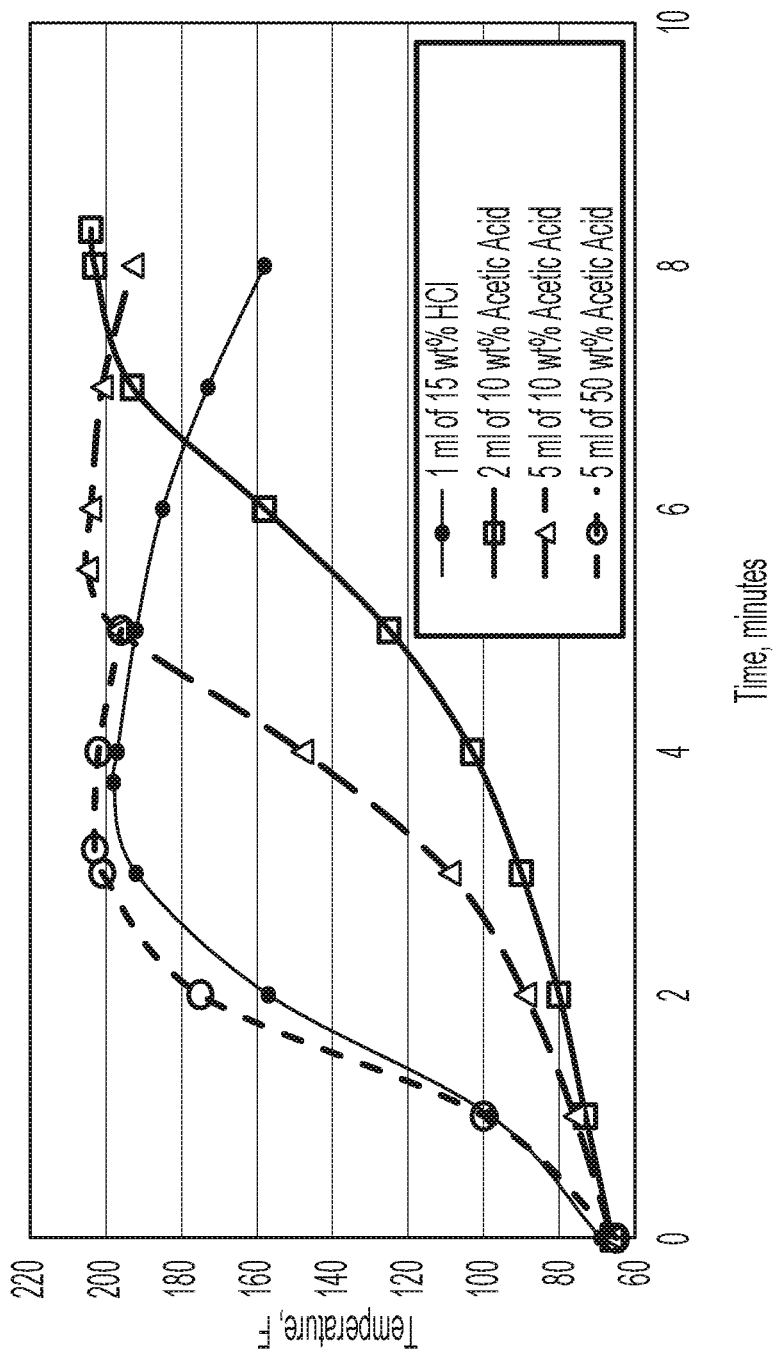
FIG. 9 graphically depicts the relationship between temperature (y-axis) and time (x-axis) during a chemical reaction, according to one or more embodiments described in this disclosure.

The effect of the acid type and concentration on catalyzing the reaction between sodium nitrite and ammonium chloride was then shown in Example 8. 30 mL of a 5 molar solution of $NH_4Cl$, and 30 mL of a 5 molar solution of $NaNO_2$ were combined with one of 1 mL of 15 wt. % HCl, 2 mL of 10 wt. % $CH_3COOH$, 5 mL of 10 wt. % $CH_3COOH$, or 5 mL of 50 wt. % $CH_3COOH$, and the temperature of the reaction for each of the four combinations is shown in FIG. 9. The reaction including 5 ml of 50 wt. % acetic acid had the most rapid increase in temperature, whereas the reaction including 2 ml of 10 wt. % acetic acid had the most delayed increase in temperature.

The following description of the embodiments is illustrative in nature and is in no way intended to be limiting it its application or use. As used throughout this disclosure, the singular forms "a," "an," and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents.

It is noted that one or more of the following claims utilize the term "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of dissolving a gas hydrate in a pipeline comprising:
    introducing a gas hydrate dissolving solution into the pipeline, the gas hydrate dissolving solution comprising sodium nitrite, ammonium chloride, a strong acid, and a weak organic acid; and
    allowing the gas hydrate dissolving solution to at least partially dissolve the gas hydrate in the pipeline, where the strong acid expedites the reaction.

2. The method of claim 1, in which the strong acid comprises hydrochloric acid and the weak organic acid comprises acetic acid.

3. The method of claim 2, in which the hydrochloric acid is an aqueous solution comprising from 10 to 50 wt. % of concentrated hydrochloric acid and the acetic acid comprises glacial acetic acid with a concentration from 95 to 99.9 wt. %.

4. The method of claim 1, in which introducing the gas hydrate dissolving solution comprises introducing from 1 to 60 vol. % gas hydrate dissolving solution, based on a total volume of water in the pipeline.

5. The method of claim 1, in which the gas hydrate dissolving solution comprises:
    from 5 to 30 vol. % sodium nitrite solution, based on a total volume of water in the pipeline;
    from 5 to 30 vol. % ammonium chloride solution, based on the total volume of water in the pipeline;
    from 0.2 to 2 vol. % strong acid, based on the total volume of water in the pipeline; and
    from 0.5 to 5 vol. % weak organic acid, based on the total volume of water in the pipeline.

6. The method of claim 5, in which the sodium nitrite solution comprises from 0.5 to 10 moles sodium nitrite.

7. The method of claim 5, in which the ammonium chloride solution comprises from 0.5 to 10 moles ammonium chloride.

8. The method of claim 1, in which the gas hydrate dissolving solution comprises:
    from 20 to 30 vol. % sodium nitrite, based on a total volume of water in the pipeline;
    from 20 to 30 vol. % ammonium chloride, based on the total volume of water in the pipeline;
    from 0.5 to 1 vol. % strong acid, based on the total volume of water in the pipeline; and
    from 1 to 3 vol. % weak organic acid, based on the total volume of water in the pipeline.

9. The method of claim 8, in which the strong acid comprises from 10 to 20 wt. % hydrochloric acid and the weak organic acid comprises from 5 to 15 wt. % acetic acid.

10. The method of claim 1, in which allowing the gas hydrate dissolving solution to at least partially dissolve the gas hydrate takes less than 6 hours.

11. The method of claim 1, in which the gas hydrate dissolving solution comprises an aqueous solution comprising the sodium nitrite, ammonium chloride, strong acid, and weak organic acid.

12. The method of claim 1, further comprising inhibiting gas hydrate formation in the pipeline after introducing the gas hydrate dissolving solution.

13. The method of claim 1, in which a pressure of the pipeline is greater than 500 psi and a temperature of the pipeline is less than 100° F.

14. The method of claim 1, in which the gas hydrate comprises free water, carbon dioxide, hydrogen sulfide, methane, ethane, propane, n-butane, iso-butane or combinations thereof.

15. The method of claim 1, further comprising allowing hydrocarbon fluid to flow through the pipeline during introducing the gas hydrate dissolving solution, where the hydrocarbon fluid comprises methane, ethane, propane, butane, pentane, hexane, heptane, octane, nonane, crude oil, carbon dioxide, hydrogen sulfide, dinitrogen, or combinations of these.

16. The method of claim 1, further comprising allowing the dissolved gas hydrate to discharge from the pipeline after allowing the gas hydrate dissolving solution to at least partially dissolve the gas hydrate in the pipeline.

17. The method of claim 1, in which introducing a gas hydrate dissolving solution into the pipeline comprises introducing the gas hydrate dissolving solution at an injection rate of from 0.5 gal/min to 20 gal/min.

18. The method of claim 1, in which the gas hydrate dissolving solution further comprises a corrosion inhibitor, a scale inhibitor, a demulsifier, or combinations thereof.

19. The method of claim 1, in which the gas hydrate dissolving solution further comprises glycol, a glycol ether, dimethylformamide, cesium formate, potassium formate, or combinations thereof.

20. The method of claim 1, further comprising heating the gas hydrate dissolving solution prior to introducing the gas hydrate dissolving solution into the pipeline.

21. The method of claim 1, in which the gas hydrate dissolving solution raises the temperature inside the pipeline after mixing to 20-120 deg C.

22. The method of claim 1, in which the gas hydrate dissolution solution further comprises gas hydrate inhibitors.

* * * * *